US012804690B2

(12) United States Patent
Li et al.

(10) Patent No.: US 12,804,690 B2
(45) Date of Patent: Nov. 17, 2026

(54) MULTI-SLOT PHYSICAL DOWNLINK CONTROL CHANNEL MONITORING

(71) Applicant: Intel Products IP LLC, Santa Clara, CA (US)

(72) Inventors: Yingyang Li, Beijing (CN); Gang Xiong, Beaverton, OR (US); Yi Wang, Beijing (CN); Dae Won Lee, Portland, OR (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/091,490

(22) Filed: Dec. 30, 2022

(65) Prior Publication Data

US 2023/0147905 A1 May 11, 2023

Related U.S. Application Data

(60) Provisional application No. 63/297,998, filed on Jan. 10, 2022, provisional application No. 63/309,235, filed on Feb. 11, 2022, provisional application No. 63/314,722, filed on Feb. 28, 2022.

(51) Int. Cl.

| | |
|---|---|
| ***H04W 72/51*** | (2023.01) |
| ***H04W 72/1273*** | (2023.01) |
| ***H04W 72/23*** | (2023.01) |

(52) U.S. Cl.
CPC ....... *H04W 72/51* (2023.01); *H04W 72/1273* (2013.01); *H04W 72/23* (2023.01)

(58) Field of Classification Search
CPC .................................................... H04W 72/51
See application file for complete search history.

(56) References Cited

U.S. PATENT DOCUMENTS

| | | | | |
|---|---|---|---|---|
| 2022/0304015 | A1* | 9/2022 | Yi | H04W 24/08 |
| 2023/0007624 | A1* | 1/2023 | Murray | H04W 68/005 |
| 2024/0089974 | A1* | 3/2024 | Oteri | H04L 5/0092 |
| 2024/0260010 | A1* | 8/2024 | Davydov | H04L 5/0053 |
| 2024/0357617 | A1* | 10/2024 | Tiirola | H04W 72/0446 |
| 2024/0388482 | A1* | 11/2024 | He | H04L 5/0094 |
| 2024/0396694 | A1* | 11/2024 | Kuang | H04L 5/0023 |
| 2024/0414635 | A1* | 12/2024 | Bhamri | H04L 5/0053 |
| 2025/0081202 | A1* | 3/2025 | Choi | H04W 72/23 |
| 2025/0141529 | A1* | 5/2025 | Matsumura | H04B 7/088 |
| 2025/0351144 | A1* | 11/2025 | He | H04W 72/0446 |

* cited by examiner

*Primary Examiner* — Jason E Mattis
(74) *Attorney, Agent, or Firm* — Schwegman Lundberg & Woessner, P.A.

(57) ABSTRACT

An apparatus and system of physical downlink control channel (PDCCH) monitoring above 52.6 GHz using a multi-slot PDCCH monitoring capability are described. The PDCCH monitoring capability has a group of X consecutive non-overlapping slots. A first group of search space (SS) sets are monitored within Y consecutive slots within a slot group. The location of the Y slots within a slot group is maintained across different slot groups. The first group of SS sets include a UE specific SS (USS) set, a Type3 CSS set and/or a Type 1 CSS set with dedicated RRC configuration.

20 Claims, 16 Drawing Sheets

MULTI-SLOT PHYSICAL DOWNLINK CONTROL CHANNEL MONITORING

PRIORITY CLAIM

This application claims the benefit of priority to U.S. Provisional Patent Application Ser. No. 63/297,998, filed Jan. 10, 2022, U.S. Provisional Patent Application Ser. No. 63/309,235, filed Feb. 11, 2022, and U.S. Provisional Patent Application Ser. No. 63/314,722, filed Feb. 28, 2022, each of which is incorporated herein by reference in its entirety.

TECHNICAL FIELD

Embodiments pertain to wireless communications. In particular, some embodiments relate to monitoring of physical downlink control channel (PDCCH) transmissions.

BACKGROUND

The use and complexity of wireless systems has increased due to both an increase in the types of electronic devices using network resources as well as the amount of data and bandwidth being used by various applications, such as video streaming, operating on the electronic devices. As expected, a number of issues abound with the advent of any new technology, including complexities related to PDCCH monitoring in new radio (NR) systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
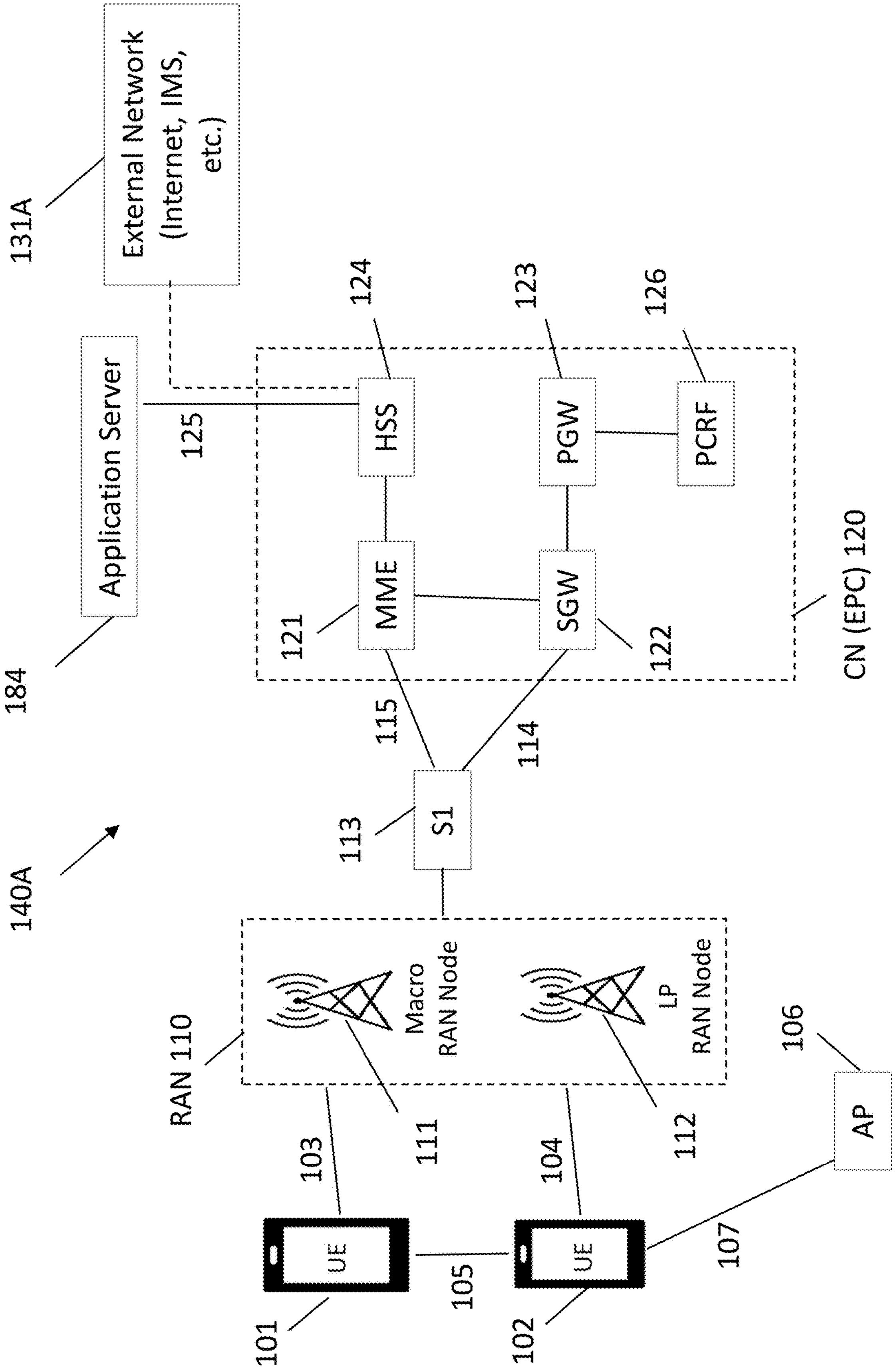
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as next generation NodeB (xNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signalling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signalling connection and UE-associated services that are related to a single UE and are associated with a UE-associated signalling connection that is maintained for the UE.

The F1 interface may be disposed between the CU and the DU. The CU may control the operation of the DU over the F1 interface. As the signalling in the gNB is split into control plane and user plane signalling, the F1 interface may be split into the F1-C interface for control plane signalling between the gNB-DU and the gNB-CU-CP, and the F1-U interface for user plane signalling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission-reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signalling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
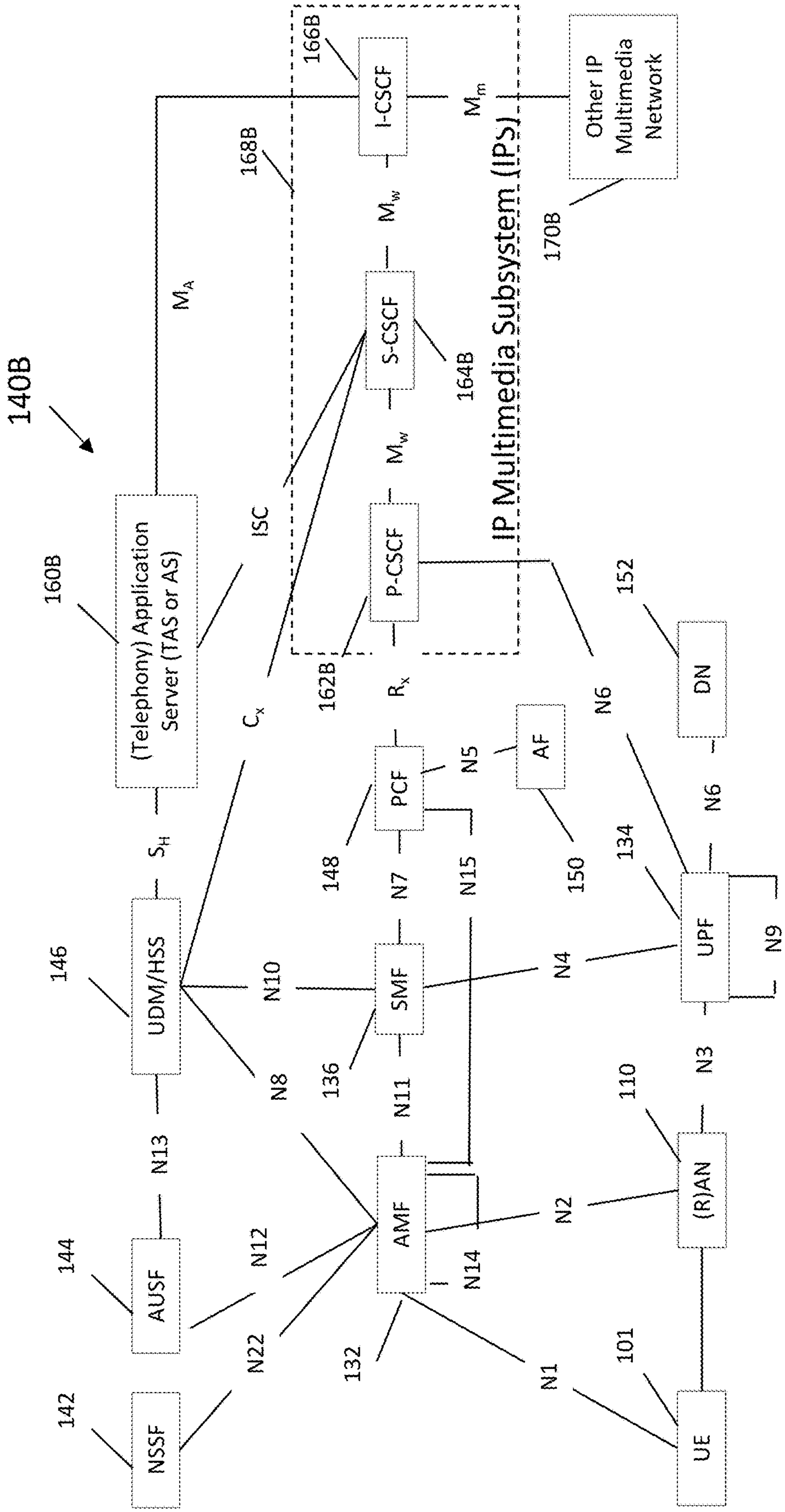
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
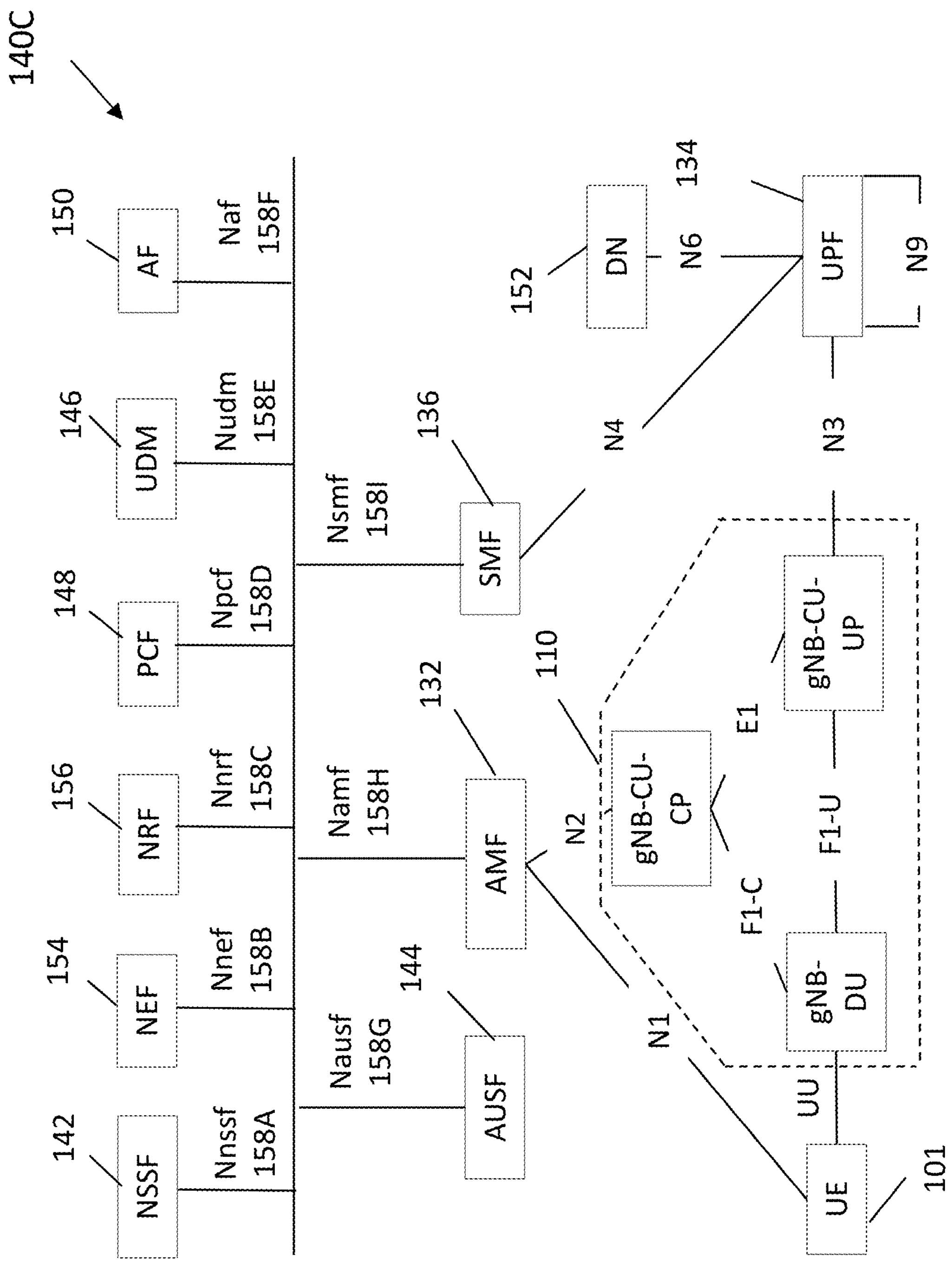
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
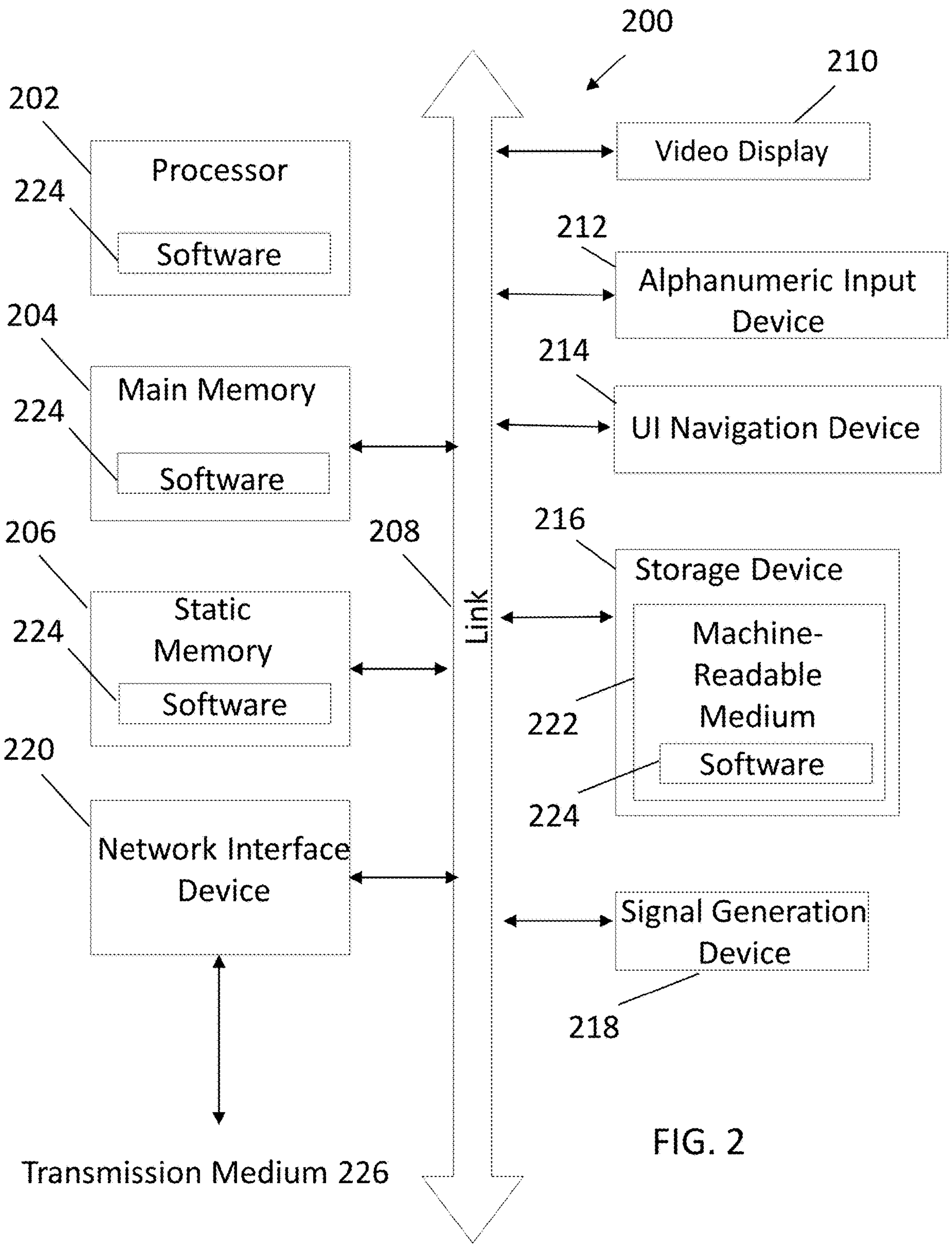
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs— note that this term is typically used in the context of 3GPP 5G and 6G communication systems, etc. Still, a UE may take this role as well and act as an AP, eNB, or gNB; that is some or all features defined for network equipment may be implemented by a UE.

As above, mobile communication has evolved from early voice systems to today's highly sophisticated integrated communication platform. The next generation wireless communication system, 5G, or new radio (NR) may provide access to information and sharing of data anywhere, anytime by various users and applications. NR is expected to be a unified network/system that target to meet vastly different and sometime conflicting performance dimensions and services. Such diverse multi-dimensional requirements may be driven by different services and applications. In general, NR will evolve based on 3GPP long term evolution (LTE)-Advanced with additional potential new Radio Access Technologies (RATs) to enrich people lives with better, simple and seamless wireless connectivity solutions. NR may enable wireless connection and deliver fast, rich content and services.

Figure 3:
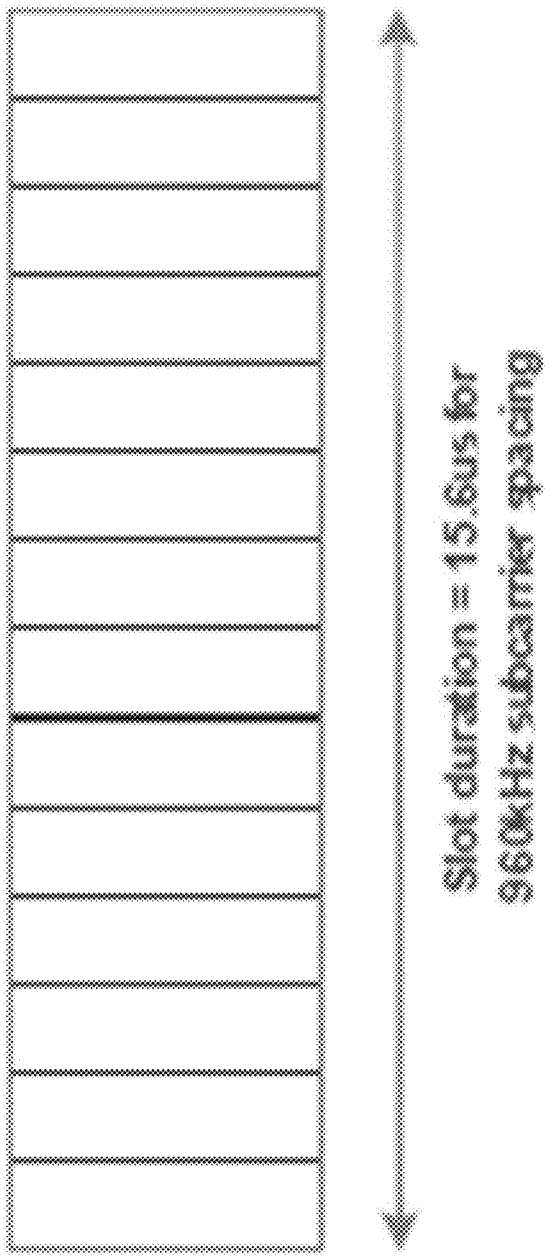
FIG. 3 illustrates a short slot duration of larger subcarrier spacing in accordance with some embodiments.

FIG. 3 illustrates a short slot duration of larger subcarrier spacing in accordance with some embodiments. As defined in NR, one slot has 14 symbols. For a system operating at or above an approximately 52.6 GHz carrier frequency, if a larger subcarrier spacing (SCS), e.g., on the order of approximately 960 kilohertz (kHz) is employed, the slot duration may be very short. For instance, for a SCS 960 kHz, one slot duration is approximately 15.6 microseconds (μs) as shown in FIG. 3.

In NR, a control resource set (CORESET) is a set of time/frequency resources carrying physical downlink control channel (PDCCH) transmissions. The CORESET is divided into multiple control channel elements (CCEs). A PDCCH candidate with aggregation level (AL) L may include L CCEs. In embodiments, L may be 1, 2, 4, 8, 16. A search space set may be configured to a UE, which configures the timing for PDCCH monitoring and a set of CCEs carrying PDCCH candidates for the UE.

In NR release-15 (Rel-15) specifications, the maximum number of monitored PDCCH candidates and non-overlapped CCEs for PDCCH monitoring in a slot are specified for the UE. When the subcarrier spacing is increased from approximately 15 kHz to approximately 120 kHz, the maximum number of blind decodings (BDs) and CCEs for PDCCH monitoring in a slot is reduced substantially. This is primarily due to the UE processing capability with short symbol and slot duration. For a system operating between 52.6 GHz and 71 GHz carrier frequency, when a large subcarrier spacing is introduced, the slot becomes quite short. Consequently, it is not desired to force the UE to monitor the PDCCH in every slot due to concern on power consumption and complexity at the UE side. Further, if the maximum number of monitored PDCCH candidates and non-overlapped CCEs per slot is reduced substantially, this may cause a limitation on the gNB scheduling flexibility.

To this end, multi-slot PDCCH monitoring capability may be used. Embodiments herein thus relate to PDCCH monitoring with multi-slot PDCCH monitoring capability in system operating at or above an approximately 52.6 GHz carrier frequency.

The multi-slot PDCCH monitoring capability may be defined in a group of X consecutive slots. The slot groups may be consecutive and non-overlapping. The start of the first slot group in a subframe is aligned with the subframe boundary. A first group of search space (SS) sets are monitored within Y consecutive slots within a slot group. The location of the Y slots within a slot group is maintained across different slot groups. The first group of SS sets may include a UE-specific SS (USS) set, a Type3 common search space (CSS) set, and/or a Type 1 CSS set with dedicated radio resource control (RRC) configuration. All the other SS sets, which belong to the second group of SS sets, are not restricted to the Y slots. For example, X can be 4 or 8 for SCS 480 or 960 kHz, which has same duration as a slot of SCS 120 kHz. A typical value of Y is 1 which is good for power saving at the UE. A larger Y may also be supported. The multi-slot PDCCH monitoring capability may be expressed as a combination (X, Y).

Figure 4:
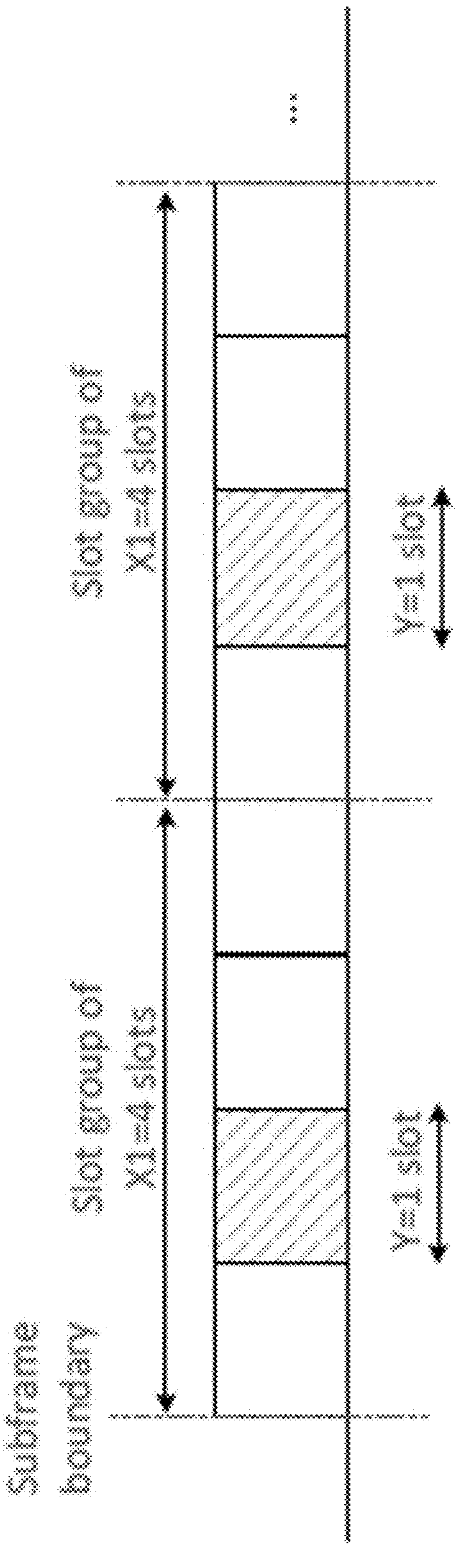
FIG. 4 illustrates a multi-slot PDCCH monitoring capability in accordance with some embodiments.

FIG. 4 illustrates a multi-slot PDCCH monitoring capability in accordance with some embodiments. The example of FIG. 4 shows a multi-slot PDCCH monitoring capability with combination (4, 1). The UE only monitors the first group of SS sets in the Y=1 slot in every X-slot group.

For the case Y=1 in the multi-slot PDCCH monitoring capability combination (X, Y), the first group of SS sets can be monitored in up to M spans in the Y=1 slot in the slot group of X slots. Each span can contain up to n consecutive orthogonal frequency division multiplexing (OFDM) symbols. M, n can be predefined, e.g., M=2, n=3. For example, the distance of the first symbol of the two spans is at least 7 symbols for SCS 960 kHz, and the distance of the first symbol of the two spans is at least 4 symbols for SCS 480 kHz. For Y>1 for the multi-slot PDCCH monitoring capability combination (X, Y), the first group of SS sets can be monitored only in the first n OFDM symbols of each of the Y slots in the slot group of X slots. a span of the second group of SS sets can be in any slot in a slot group of X slots.

Maximum BD/CCE Handling

With multi-slot PDCCH monitoring capability combination (X, Y), the total numbers of monitored PDCCH candidates and non-overlapped CCEs are determined in a slot group of X slots. The total numbers of monitored PDCCH candidates and non-overlapped CCEs for a scheduled cell should not exceed the corresponding maximum numbers $$M_{PDCCH}^{max,(X,Y),\mu},\ C_{PDCCH}^{max,(X,Y),\mu}.$$

$$M_{PDCCH}^{max,(X,Y),\mu},\ C_{PDCCH}^{max,(X,Y),\mu}$$

applies per CORESET pool if two CORESET pools are configured by two coresetPoolIndex values 0 and 1. For example, in a slot group with X=4/8 slots for SCS 480/960 kHz, $$M_{PDCCH}^{max,(X,Y),\mu}=20,\ C_{PDCCH}^{max,(X,Y)\mu}=32.$$

Further, $$M_{PDCCH}^{total,(X,Y),\mu},\ C_{PDCCH}^{total,(X,Y),\mu}$$

can be determined for the multiple scheduled cells subjected to a limitation on the SCS numerology μ and/or combination (X, Y) of the associated scheduling cells. For example, the associated scheduling cells use same SCS numerology μ and same X.

The total numbers of monitored PDCCH candidates and non-overlapped CCEs of all configured SS sets for PCell and/or PSCell may exceed the maximum numbers $$M_{PDCCH}^{max,(X,Y),\mu},\ C_{PDCCH}^{max,(X,Y)\mu},\ M_{PDCCH}^{total,(X,Y),\mu},\text{ or } C_{PDCCH}^{total,(X,Y),\mu}.$$

In such case, a PDCCH overbooking rule may be defined to drop a USS set. In addition, the gNB should ensure that the total numbers of monitored PDCCH candidates and non-overlapped CCEs of all configured SS sets for a SCell will not exceed the maximum numbers $$M_{PDCCH}^{max,(X,Y),\mu},\ C_{PDCCH}^{max,(X,Y)\mu},\ M_{PDCCH}^{total,(X,Y)\mu},\text{ and } C_{PDCCH}^{total(X,Y),\mu}.$$

In one embodiment, to determine the total numbers of monitored PDCCH candidates and non-overlapped CCEs in a slot group of X slots, a SS set in a span that is not monitored in the slot group by the UE may not be counted. The UE may selectively monitor a subset of spans of a SS set. A rule for the UE to not monitor a SS set in a span in a slot group is to be defined, so that the gNB can know the actual PDCCH monitoring at the UE.

In one option, the monitoring occasions (MOs) of a Type0A/2 CSS set with searchSpaceId non-zero that are not associated with one specific SSB are not monitored by the UE and not counted in the total numbers of monitored PDCCH candidates and non-overlapped CCEs in a slot group of X slots. The specific SSB could be determined by the most recent of: a medium access command (MAC) control element (CE) activation command indicating a transmission configuration indicator (TCI) state of the active bandwidth part (BWP) that includes a CORESET with index 0, as described in 3GPP TS 38.214, where the TCI-state includes a CSI-RS that is quasi-co-located with the SS/PBCH block, or a random access procedure that is not initiated by a PDCCH order that triggers a contention-free random access procedure.

Figure 5:
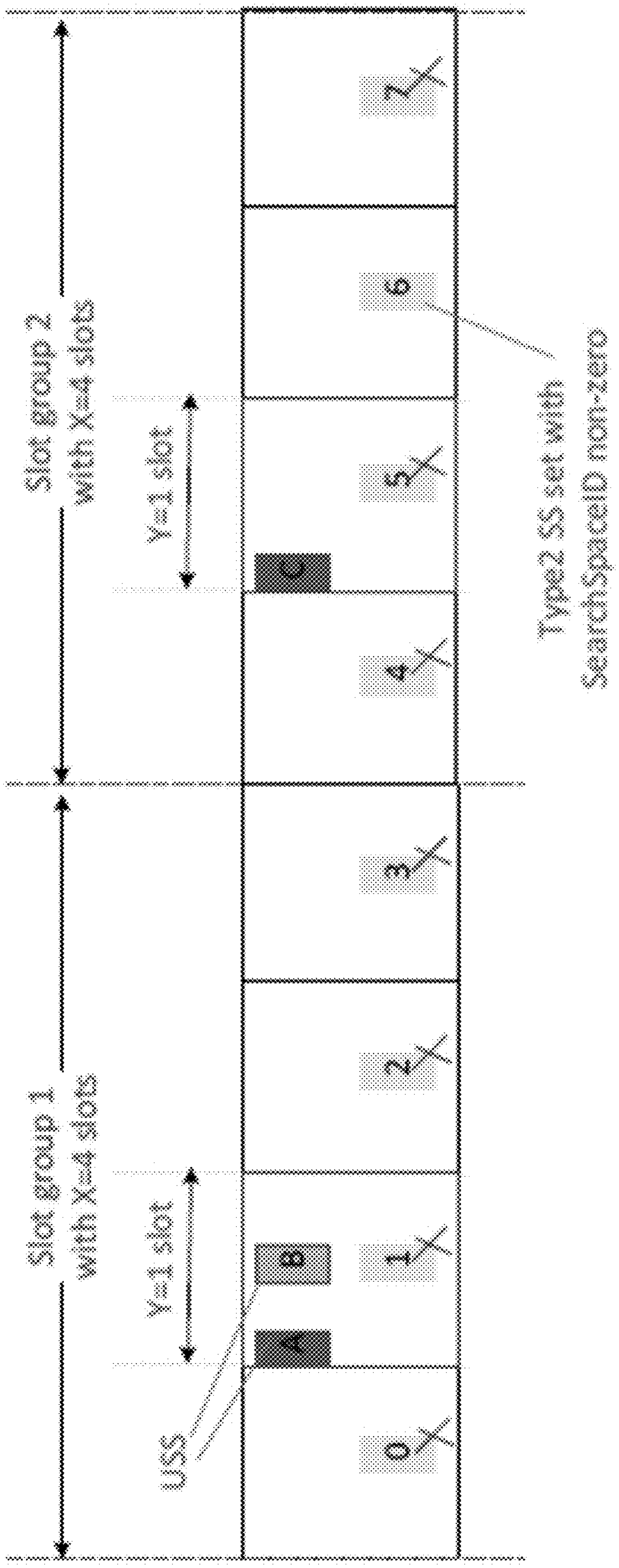
FIG. 5 illustrates monitored PDCCH candidates and non-overlapped control channel elements (CCEs) in accordance with some embodiments.

FIG. 5 illustrates monitored PDCCH candidates and non-overlapped CCEs in accordance with some embodiments. The example shown in FIG. 5 is of counting total numbers of monitored PDCCH candidates and non-overlapped CCEs in a slot group by excluding the MOs for a Type2 CSS set with searchSpaceId non-zero that are not monitored by UE. It assumes a multi-slot PDCCH monitoring capability with combination (X, Y)=(4, 1). A USS set is configured in the Y=1 slot in every slot group for a UE. Another USS set is configured in the Y=1 slot in every 2 or more slot groups for the UE. A Type2 CSS set with searchSpaceId non-zero is configured in each slot. It is assumed that 8 signaling system blocks (SSBs) are transmitted by the gNB. The 8 MOs of the Type2 CSS set with searchSpaceId non-zero in the 8 slots of the two slot groups are respectively associated with the 8 SSBs. Assuming the UE is currently working on SSB 6, the UE only monitors the Type2 CSS set with searchSpaceId non-zero in MO 6. Since the UE doesn't monitor MO 0-5 and 7, the MO 0-5 and 7 are not counted in the total numbers of monitored PDCCH candidates and non-overlapped CCEs. In slot group 2, the corresponding total numbers are determined by the MO C for USS and MO 6 of Type2 CSS set with searchSpaceId non-zero. On the other hand, in slot group 1, the corresponding total numbers are determined by the MO A & B for USS. Since the UE doesn't monitor any MO of Type2 CSS set with searchSpaceId non-zero, it is possible for the UE to monitor more USS sets.

In another option, the MOs of a Type0A/2 CSS set with searchSpaceId non-zero are not counted in the total numbers of monitored PDCCH candidates and non-overlapped CCEs in a slot group of X slots, if the MOs are not associated with one specific SSB or if the UE does not detect paging information or a system information update. Whether the UE is to monitor paging information in a MO may be determined by the configuration of paging occasion of the UE. Whether the UE is to monitor system information in a MO may be determined by the configuration of system information update. The specific SSB may be determined by the most recent of: a MAC CE activation command indicating a TCI state of the active BWP that includes a CORESET with index 0, as described in TS 38.214, where the TCI-state includes a CSI-RS which is quasi-co-located with the SS/PBCH block, or a random access procedure that is not initiated by a PDCCH order that triggers a contention-free random access procedure.

In another option, the MOs of a Type0A/2 CSS set with searchSpaceId non-zero that are not associated with one or multiple specific SSBs are not monitored by the UE and are not counted in the total numbers of monitored PDCCH candidates and non-overlapped CCEs in a slot group of X slots. The one or multiple specific SSBs may be configured by higher layer signaling. The one or multiple specific SSBs may include at least the SSB that is determined by the most recent of: a MAC CE activation command indicating a TCI state of the active BWP that includes a CORESET with index 0, as described in TS 38.214, where the TCI-state includes a CSI-RS that is quasi-co-located with the SS/PBCH block, or a random access procedure that is not initiated by a PDCCH order that triggers a contention-free random access procedure.

In another option, the MOs of a Type0A/2 CSS set with searchSpaceId non-zero are not counted in the total numbers of monitored PDCCH candidates and non-overlapped CCEs in a slot group of X slots, if the MOs are not associated with one or multiple specific SSBs or if the UE does not detect paging information or a system information update. The one or multiple specific SSBs may be configured by higher layer signaling. Whether the UE is to monitor paging information in a MO may be determined by the configuration of paging occasion of the UE. Whether the UE is to monitor system information in a MO may be determined by the configuration of system information update. The one or multiple specific SSBs may include at least the SSB that is determined by the most recent of: a MAC CE activation command indicating a TCI state of the active BWP that includes a CORESET with index 0, as described in TS 38.214, where the TCI-state includes a CSI-RS that is quasi-co-located with the SS/PBCH block, or a random access procedure that is not initiated by a PDCCH order that triggers a contention-free random access procedure.

In another option, the MOs of CSS set with searchSpaceId 0 are not counted in the total numbers of monitored PDCCH candidates and non-overlapped CCEs in a slot group of X slots, if the UE does not detect paging information or a system information update. The MOs of the CSS set with searchSpaceId 0 is associated with one specific SSB. The specific SSB may be determined by the most recent of: a MAC CE activation command indicating a TCI state of the active BWP that includes a CORESET with index 0, as described in TS 38.214, where the TCI-state includes a CSI-RS that is quasi-co-located with the SS/PBCH block, or a random access procedure that is not initiated by a PDCCH order that triggers a contention-free random access procedure.

In one embodiment, to determine the total numbers of monitored PDCCH candidates and non-overlapped CCEs in a slot group of X slots, if one or multiple MOs are configured in a slot group of X slots for the Type1 CSS without a dedicated RRC configuration and/or Type0/0A/2 CSS, the UE may count the monitored PDCCH candidates and non-overlapped CCEs in at most M MO towards the corresponding total numbers in the slot group. M is predefined or configured by higher layer signaling, e.g., M=1. The priority of a MO can be determined by the high prioritized CSS type configured in the MO. A fixed priority rule may be predefined to determine the M MOs. For example, the priority of MO is decreased in the order of Type®, Type0A, Type2, Type1. Alternatively, the prioritized type of CSS is determined according to the UE state. For example, if the UE is to monitor paging information, Type2 CSS is prioritized; if the UE is to monitor other system information, Type0A CSS is prioritized; if the UE is to receive SIB1, Type® CSS is prioritized.

In one option, the UE may count the number of monitored PDCCH candidates or non-overlapped CCEs in the at most M MOs that are configured with the maximum corresponding numbers among the one or multiple MOs in the slot group. In this option, if two MOs of multiple CSS sets are overlapped, the number of monitored PDCCH candidates or non-overlapped CCEs are determined jointly.

In one option, the number of monitored PDCCH candidates or non-overlapped CCEs is separately determined for each of the Type1 CSS without dedicated RRC configuration and Type0/0A/2 CSS in a slot group. The corresponding total numbers in the slot group are the sum of the individual numbers.

In one embodiment, to determine the total numbers of monitored PDCCH candidates and non-overlapped CCEs in a slot group of X slots, if one or multiple spans are configured in a slot group of X slots for the Type1 CSS without dedicated RRC configuration and/or Type0/0A/2 CSS, the UE may count the monitored PDCCH candidates and non-overlapped CCEs in at most M spans towards the corresponding total numbers in the slot group. M is predefined or configured by higher layer signaling, e.g., M=1. The priority of a span can be determined by the high prioritized CSS type configured in the span. A fixed priority rule may be predefined to determine the at most M spans. For example, the priority of CSS types is decreased in the order of Type0, Type0A, Type2. Alternatively, the prioritized type of CSS is determined according to the UE state. For example, if the UE is to monitor paging information, Type2 CSS is prioritized; if the UE is monitor other system information, Type0A CSS is prioritized; if the UE is to receive SIB1, Type0 CSS is prioritized.

In one option, the UE may count the number of monitored PDCCH candidates or non-overlapped CCEs in the at most M spans that are configured with the maximum corresponding numbers among the one or multiple MOs in the slot group.

In one option, the number of monitored PDCCH candidates or non-overlapped CCEs is separately determined for the at most M spans of each of the Type1 CSS without dedicated RRC configuration or Type0/0A/2 CSS in a slot group. The corresponding total numbers in the slot group are the sum of the individual numbers.

In one embodiment, to determine the total numbers of monitored PDCCH candidates and non-overlapped CCEs in a slot group of X slots, if one or multiple types of CSSs from Type1 CSS without dedicated RRC configuration and/or Type0/0A/2 CSS are configured in the slot group, the UE may count the monitored PDCCH candidates and non-overlapped CCEs in at most M MO of one of the CSS types. M is predefined or configured by higher layer signaling, e.g., M=1. The UE may only monitor the other CSS types if they are configured in the same MO(s) as the one CSS type. A fixed priority rule may be predefined to determine the above one CSS type. For example, the priority is decreased in the order of Type0, Type0A, Type2, Type1. Alternatively, the prioritized type of CSS is determined according to the UE state. For example, if the UE is to monitor paging information, Type2 CSS is prioritized; if the UE is to monitoring other system information, Type0A CSS is prioritized; if the UE is to receive SIB1, Type0 CSS is prioritized.

In one option, if the UE would detect Type0 CSS in a MO in a slot group, the UE only monitors the Type1 CSS without dedicated RRC configuration or the Type0A/2 CSS if configured in the same MO. In another option, if UE would detect Type0A CSS in a MO in a slot group, the UE only monitors the Type1 CSS without a dedicated RRC configuration or the Type0/2 CSS if configured in the same MO. In another option, if the UE would detect Type2 CSS in a MO in a slot group, the UE only monitors the Type1 CSS without dedicated RRC configuration or the Type0/0A CSS if configured in the same MO. In another option, if the UE would detect Type1 CSS without dedicated RRC configuration in a MO in a slot group, the UE only monitors the Type0/0A/2 CSS if it is configured in the same MO.

In one embodiment, to determine the total numbers of monitored PDCCH candidates and non-overlapped CCEs in a slot group of X slots, if one or multiple types of CSSs from Type1 CSS without dedicated RRC configuration and/or Type0/0A/2 CSS are configured in the slot group, the UE may count the monitored PDCCH candidates and non-overlapped CCEs in at most M spans of one of the CSS types. M is predefined or configured by higher layer signaling, e.g., M=1. The UE may only monitor the other CSS types if they are configured in the same span(s) as the one CSS type. A fixed priority rule may be predefined to determine the above one CSS type. For example, the priority is decreased in the order of Type0, Type0A, Type2, Type1. Alternatively, the prioritized type of CSS is determined according to the UE state. For example, if the UE is to monitor paging information, Type2 CSS is prioritized; if the UE is to monitoring other system information, Type0A CSS is prioritized; if the UE is to receive SIB1, Type0 CSS is prioritized.

In one option, if the UE would detect Type0 CSS in a span in a slot group, the UE only monitors the Type1 CSS without dedicated RRC configuration or the Type0A/2 CSS if it is configured in the same span. In another option, if the UE would detect Type0A CSS in a span in a slot group, the UE only monitors the Type1 CSS without dedicated RRC configuration or the Type0/2 CSS if it is configured in the same span. In another option, if the UE would detect Type2 CSS in a span in a slot group, the UE only monitors the Type1 CSS without dedicated RRC configuration or the Type0/0A CSS if configured in the same span. In another option, if the UE would detect Type1 CSS without dedicated RRC configuration in a span in a slot group, the UE only monitors the Type0/0A/2 CSS if configured in the same span.

In one embodiment, to determine the total numbers of monitored PDCCH candidates and non-overlapped CCEs in a slot group of X slots, if multiple types of CSS from Type1 CSS without dedicated RRC configuration and/or Type0/0A/2 CSS are configured in a slot group, the UE may count the monitored PDCCH candidates and non-overlapped CCEs of only one CSS type of the multiple types of CSS. The other CSS types can be dropped. A fixed priority rule may be predefined. For example, the priority is decreased in the order of Type0, Type0A, Type2, Type1. Alternatively, the prioritized type of CSS is determined according to the UE state. For example, if the UE is to monitor paging information, Type2 CSS is prioritized; if the UE is to monitoring other system information, Type0A CSS is prioritized; if the UE is to receive SIB1, Type0 CSS is prioritized. The maximum number of spans or MOs for the prioritized CSS type that are monitored by the UE can be further limited.

In one embodiment, to determine the total numbers of monitored PDCCH candidates and non-overlapped CCEs in a slot group of X slots, i.e., $$M_{PDCCH}^{max,(X,Y),\mu},\ C_{PDCCH}^{max,(X,Y)\mu},\ M_{PDCCH}^{total,(X,Y)\mu},\text{ and } C_{PDCCH}^{total(X,Y),\mu},$$

a span of SS sets in the slot group that is dropped by other rules by the UE may not be counted. A span of SS sets may be dropped due to a limitation on the maximum number k of the spans in a slot group of X slots. In multi-slot PDCCH monitoring, it is beneficial to limit the maximum number of spans in a slot group of X slots for UE complexity reduction. That is, one or more spans in the slot group can be dropped so that the maximum number is not exceeded. Only the remaining spans are considered to derive the total numbers of monitored PDCCH candidates and non-overlapped CCEs in the slot group.

Figure 6:
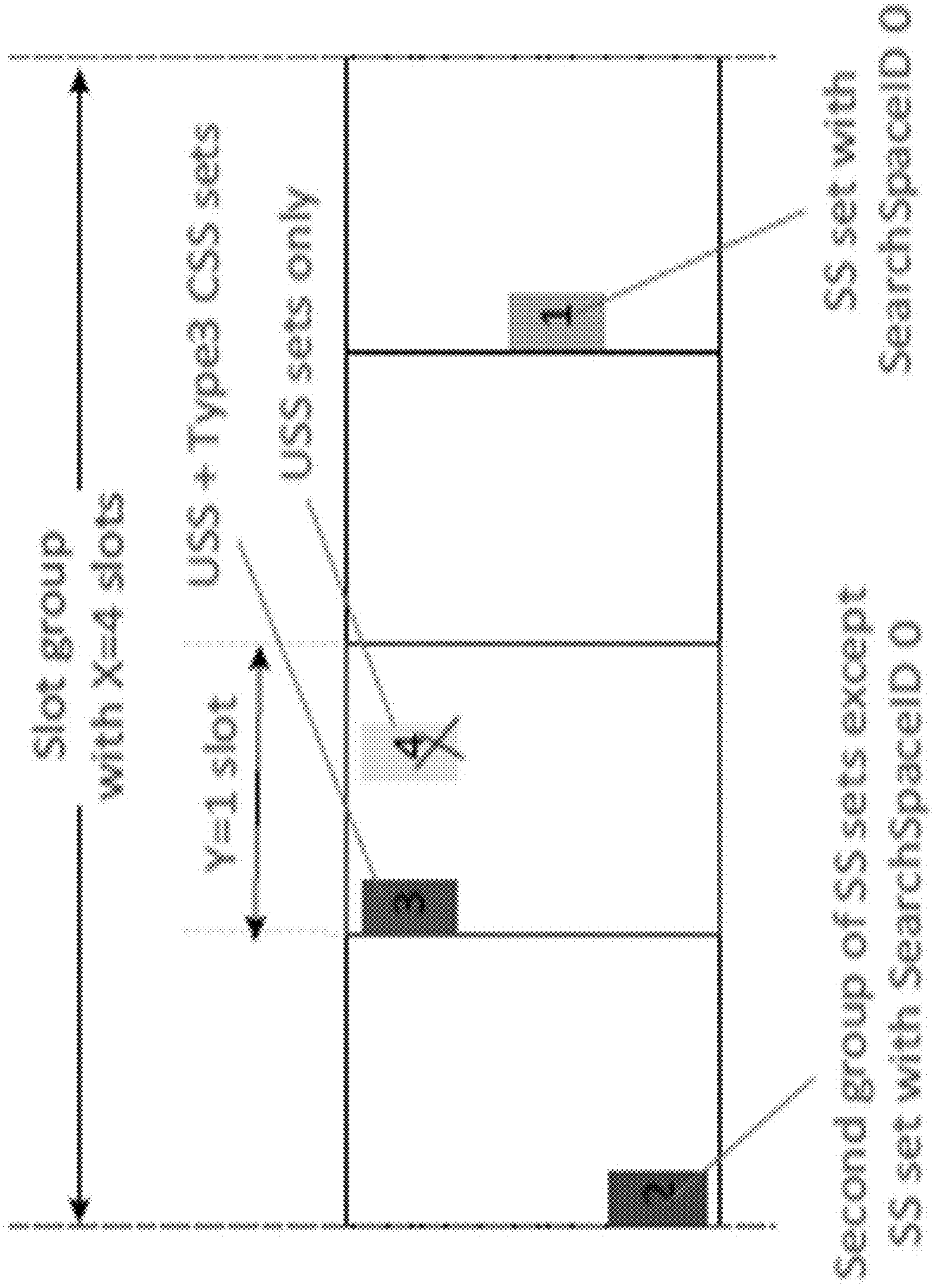
FIG. 6 illustrates another monitored PDCCH candidates and non-overlapped CCEs in accordance with some embodiments.

FIG. 6 illustrates another monitored PDCCH candidates and non-overlapped CCEs in accordance with some embodiments. FIG. 6 shows an example for counting total numbers of monitored PDCCH candidates and non-overlapped CCEs in a slot group not including a span that is dropped. FIG. 6 assumes that the span 3 is configured with Type3 CSS sets and a USS set with searchSpaceId s1, while the span 4 is only configured with a USS set with searchSpaceId s2, s1>s2. If the span 4 is dropped first, the total numbers of monitored PDCCH candidates and non-overlapped CCEs of span 1, 2 and 3 in the slot group may not exceed the corresponding maximum numbers, hence a USS set with searchSpaceId s1 in the span 3 can be available. On the other hand, if dropping the span 4 is not first considered, based on existing order for USS set dropping in PDCCH overbooking, USS sets with searchSpaceId s1 may be dropped to limit to the maximum numbers of monitored PDCCH candidates and non-overlapped CCEs. USS sets with searchSpaceId s2 are to be dropped due to the limit of maximum number of 3 spans.

Combination (X, Y) for Multi-DCI M-TRP Operation

In NR multi-DCI M-TRP operation, two CORESET pools can be configured, which are respectively identified by the two coresetPoolIndex values 0 and 1. A CORESET that is not configured with coresetPoolIndex can be handled together with the CORESET pool with coresetPoolIndex values 0. When two CORESET pools are configured, the maximum numbers of monitored PDCCH candidates and non-overlapped CCEs could apply to each CORESET pool separately.

In one embodiment, with multi-slot PDCCH monitoring capability, the combinations (X1, Y1) and (X2, Y2) for the two CORESET pools could be determined separately. X1 may be same as or different from X2. Y1 may be same as or different from Y2. For a CORESET pool, the combination (X, Y) is determined based on all configured SS sets of the CORESET pool.

In one embodiment, with multi-slot PDCCH monitoring capability, the combinations (X1, Y1) and (X2, Y2) for the two CORESET pools could be determined with a limitation X1=X2. Y1 may be same as or different from Y2. The Y1 and Y2 slots in a slot group of X1=X2 slots may overlap or not overlap. For a CORESET pool, the combination (X, Y) is determined based on all configured SS sets of the CORESET pool. If different values X are determined for the two CORESET pools, the smaller value X applies.

Figure 7:
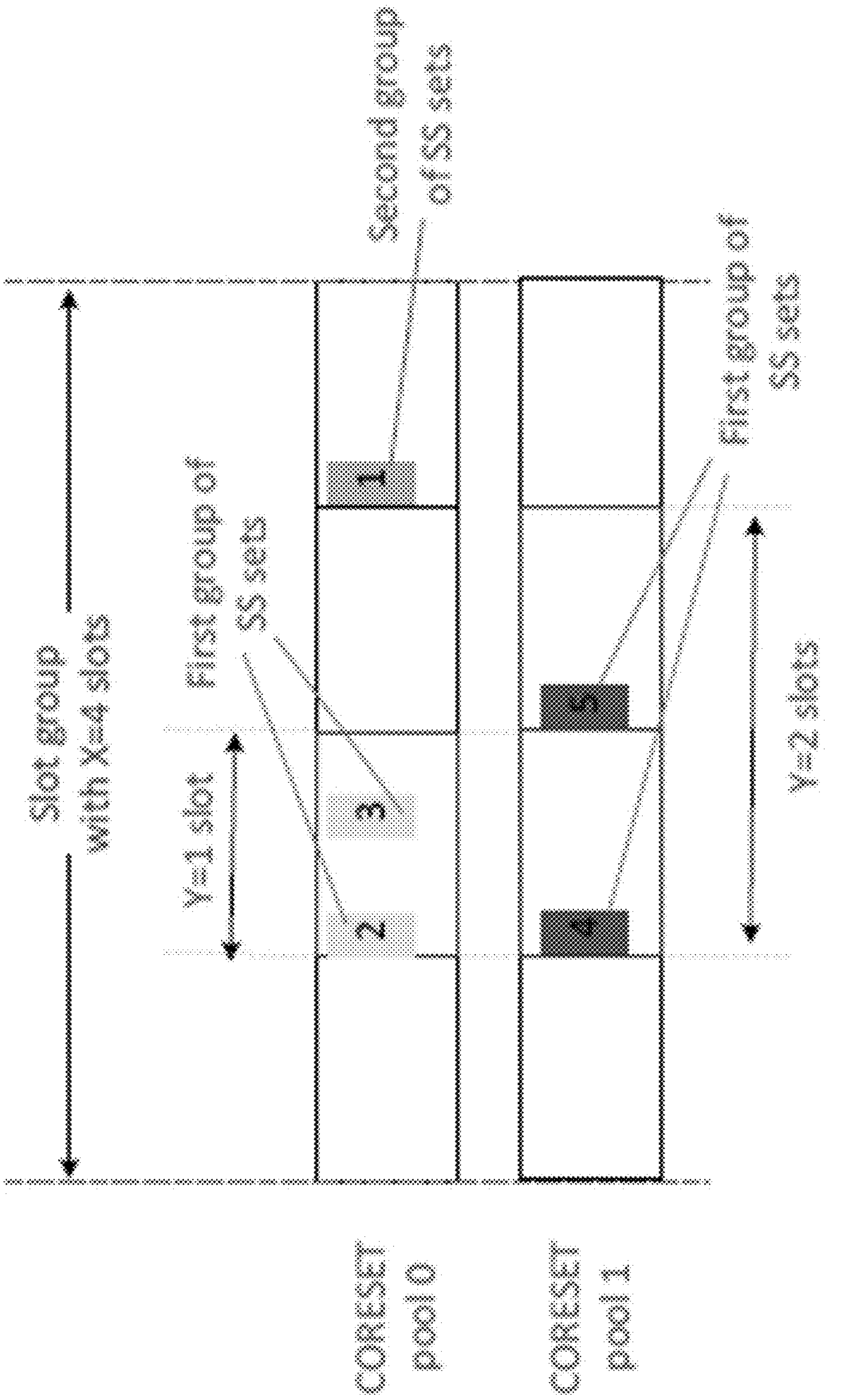
FIG. 7 illustrates combinations applied different CORESET pools in accordance with some embodiments.

FIG. 7 illustrates combinations applied different CORESET pools in accordance with some embodiments. In FIG. 7, combination (4, 1) applies to the CORESET pool 0 while combination (4, 2) applies to CORESET pool 1. Thus, the same X and different Y are used for the two CORESET pools.

In one embodiment, with multi-slot PDCCH monitoring capability, the combinations (X1, Y1) and (X2, Y2) for the two CORESET pools could be determined with a limitation X1=X2 and Y1=Y2. Note: the position of the Y1=Y2 slots in a slot group of X1=X2 slots can be same or different. For a CORESET pool, the combination (X, Y) is determined based on all configured SS sets of the CORESET pool. If different X values are determined for the two CORESET pools, the smaller X value applies. If different Y values are determined for the two CORESET pools, the largest Y value applies.

Figure 8:
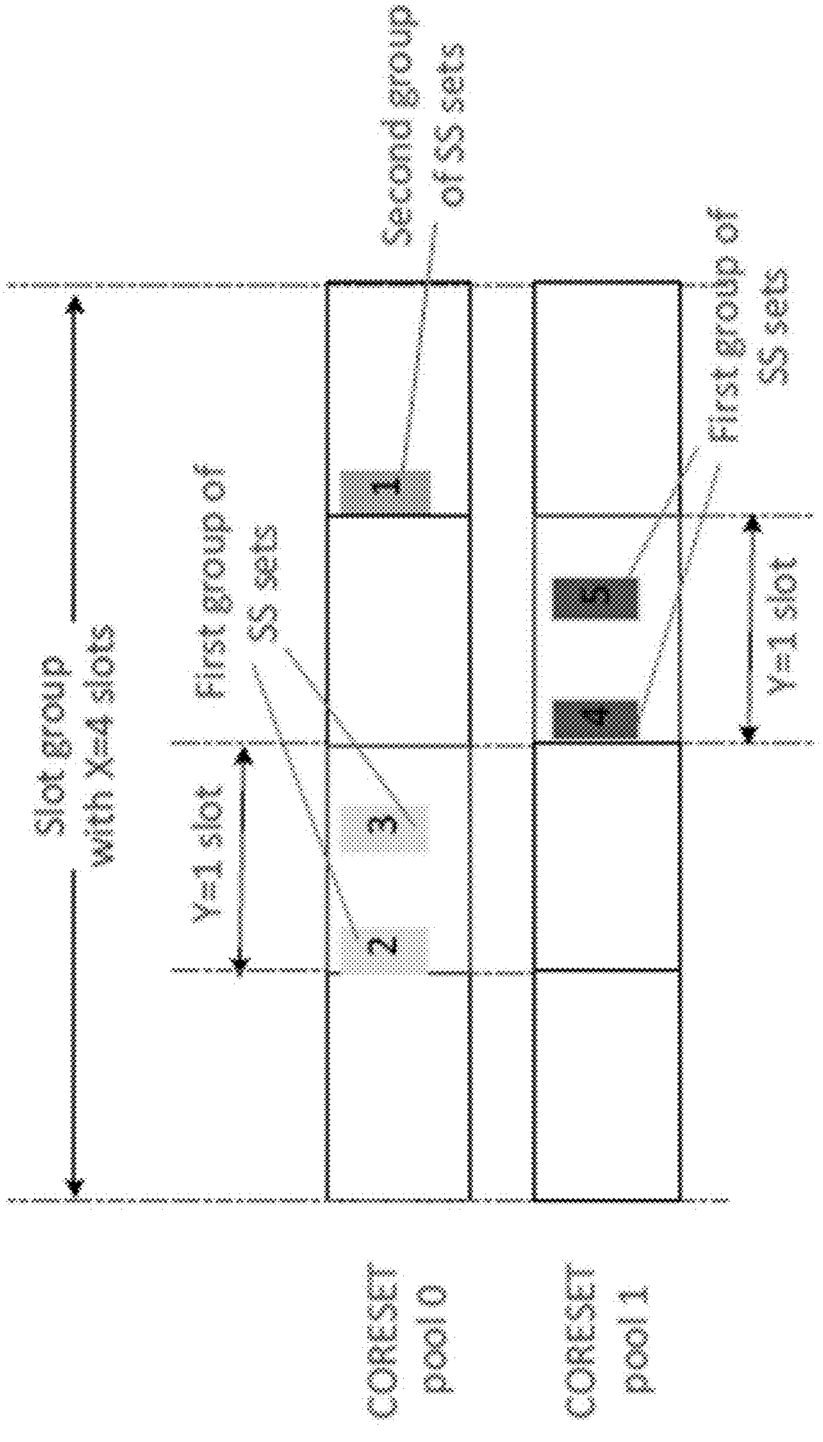
FIG. 8 illustrates a combination applied to every CORESET pool in accordance with some embodiments.

FIG. 8 illustrates a combination applied to every CORESET pool in accordance with some embodiments. In the example of FIG. 8, combination (4, 1) applies to every CORESET pool. However, the position of the Y=1 slot for the first group of SS sets can be different for the two CORESET pools. Thus, the same combination (X, Y) and different Y slots are used for the two CORESET pools.

In one embodiment, with multi-slot PDCCH monitoring capability, the combinations (X1, Y1) and (X2, Y2) for the two CORESET pools may be determined with a limitation X1=X2, Y1=Y2 and same position of the Y1=Y2 slots in the slot group of X1=X2 slots. For a CORESET pool, the combination (X, Y) is determined based on all configured SS sets of the CORESET pool. If different X values are determined for the two CORESET pools, the smaller X value applies. If different Y values are determined for the two CORESET pools, the largest Y value applies. The UE expects that the Y1=Y2 slots of the two CORESET pools are fully overlapped. In another embodiment, with multi-slot PDCCH monitoring capability, a combination (X, Y) is determined based on all SS sets configured for a UE, irrespective of the associated CORESET pool, if applicable, for a SS set.

Figure 9:
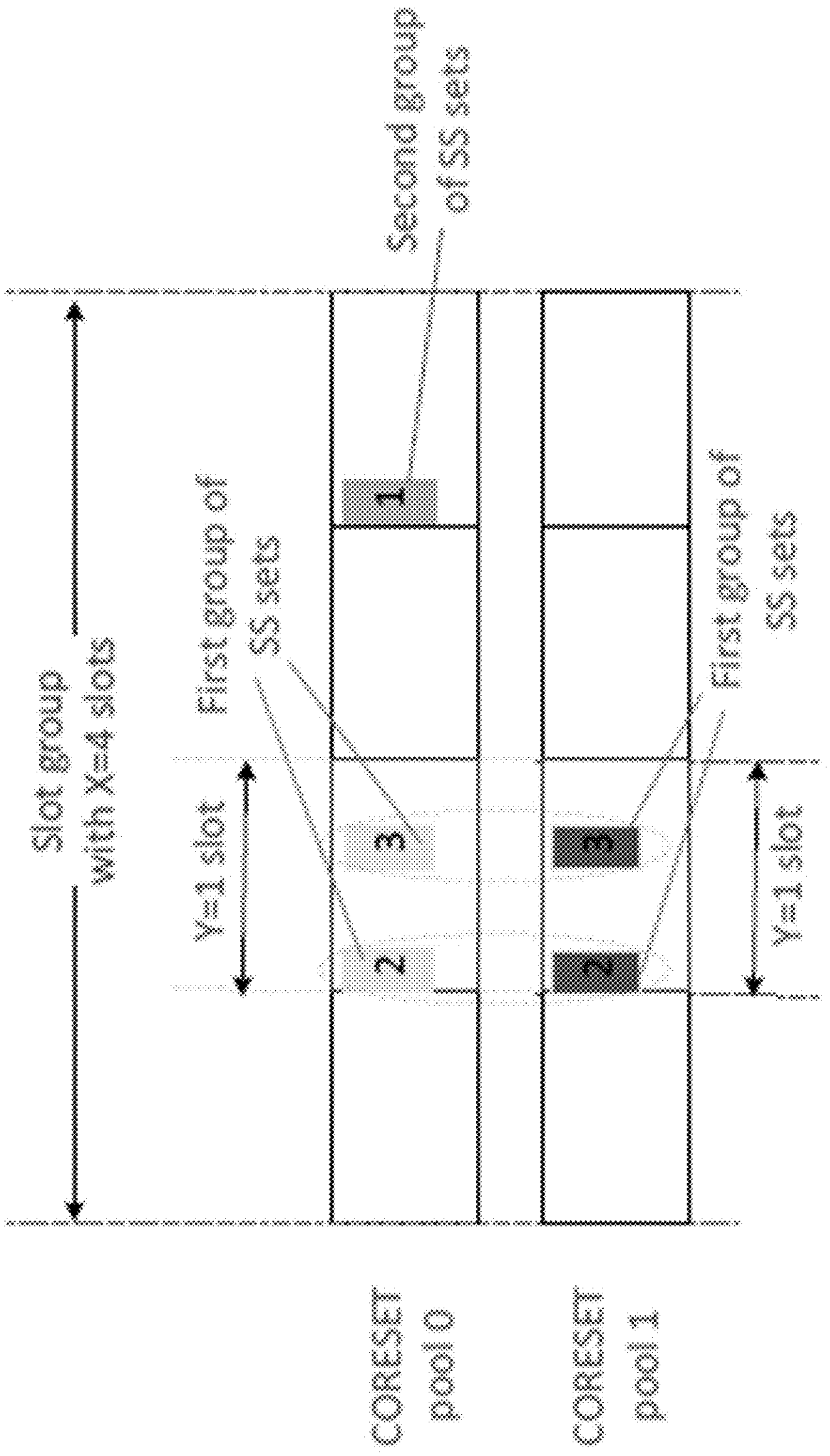
FIG. 9 illustrates a combination with the same position of the slot applies to the CORESET pools in accordance with some embodiments.

FIG. 9 illustrates a combination with the same position of the slot applies to the CORESET pools in accordance with some embodiments. In the example of FIG. 9, the combination (4, 1) with same position of the Y=1 slot applies to the two CORESET pools. This is equivalent to determine the combination (4, 1) based on all configured SS sets of the UE.

In one embodiment, with multi-slot PDCCH monitoring capability, within one slot in the Y slots, the MOs of the SS sets associated with the two CORESET pools may be configured in the same or different spans.

In one option, for a combination (X, Y) with Y=1, the SS sets can be configured in up to M spans in the Y=1 slot in the slot group of X slots, irrespective of the associated CORESET pool for a SS set. Each span can contain up to n consecutive OFDM symbols. M, n can be predefined, e.g., M=2, n=3. FIG. 9 illustrates one example in which the number of spans is still up to M=2 when two CORESET pools are configured.

In another option, for a combination (X, Y) with Y=1, the SS sets that are associated with CORESETs with same coresetPoolIndex can be configured in up to M spans in the Y=1 slot in the slot group of X slots. Further, the total number of spans in the Y=1 slot in the slot group of X slots can be up to N for the two CORESET pools. For example, N=2M. Alternatively, N can be configured by higher layer signaling or predefined M≤N≤2M. In some embodiments, there may be a limitation on the minimum distance between the spans belonging to different CORESET pools, e.g., 4 OFDM symbols.

Figure 10:
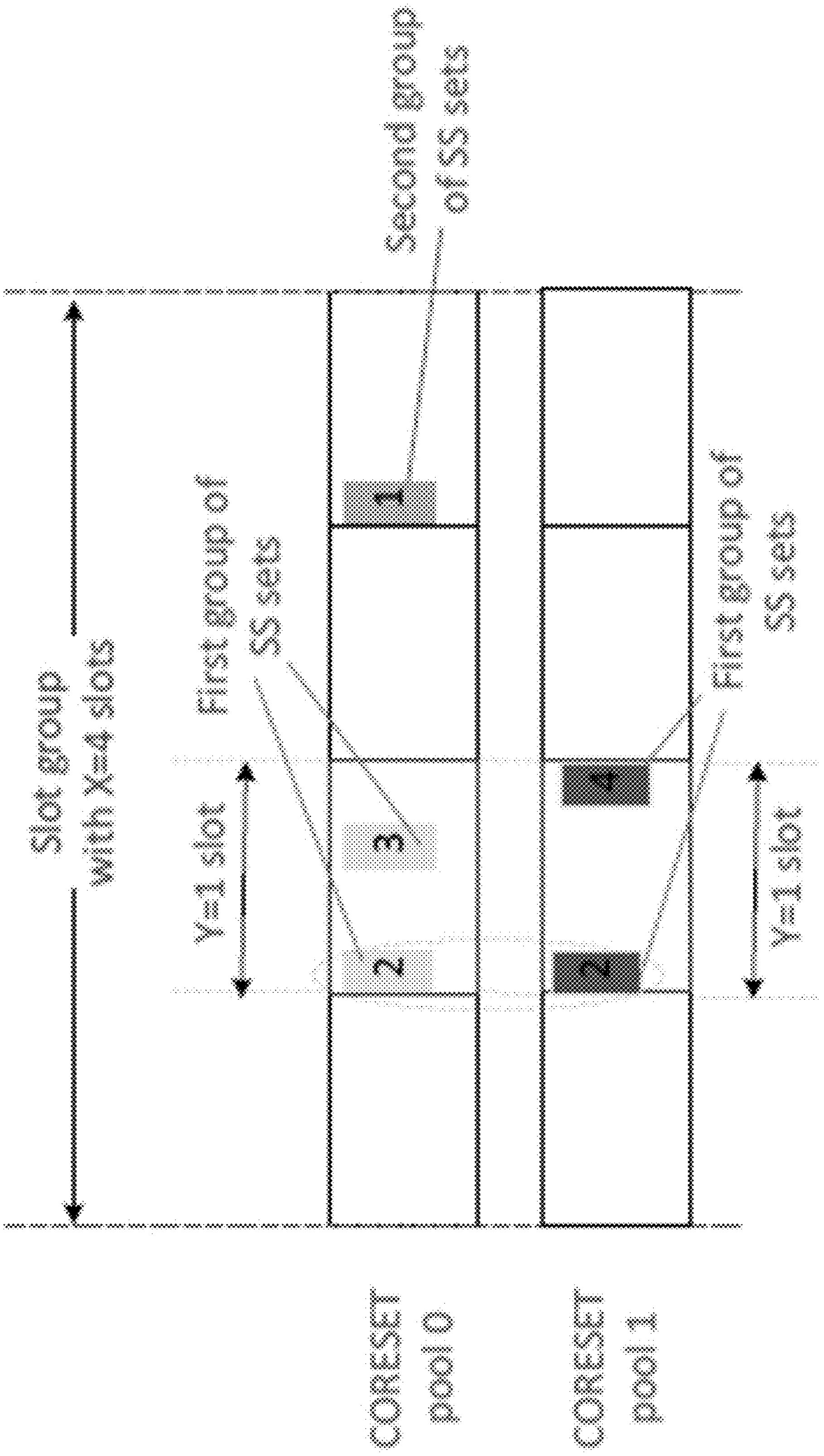
FIG. 10 illustrates a slot for a group of search space (SS) sets in accordance with some embodiments.

FIG. 10 illustrates a slot for a group of search space (SS) sets in accordance with some embodiments. FIG. 10 shows an example to allow up to 3 spans to be configured in the Y=1 slot for the first group of SS sets. The first group of SS sets for each CORESET pool are still limited to up to 2 spans. It is up to the gNB to configure the SS sets of the two CORESET pools in same span, e.g., span 2.

In one option, for a combination (X, Y) with Y>1, the SS sets can be configured in a span of the first n OFDM symbols of each of the Y slots in a slot group of X slots, irrespective of the associated CORESET pool for a SS set. Each span can contain up to n consecutive OFDM symbols. n can be predefined, e.g., n=3.

In another option, for a combination (X, Y) with Y>1, the SS sets that are associated with CORESETs with a first coresetPoolIndex value can be configured in a span of the first n consecutive OFDM symbols of each of the Y slots in a slot group of X slots. On the other hand, the SS sets that are associated with CORESETs with a second coresetPoolIndex value can be configured in a span of same or different n consecutive OFDM symbols of each of the Y slots in a slot group of X slots. The total number of spans in the Y>1 slots in the slot group of X slots can be up to N. For example, N=2Y. Alternatively, N can be configured by higher layer signaling or predefined Y≤N≤2Y. There may be a limitation on the minimum distance between the spans belonging to different CORESET pools, e.g., 4 or 7 OFDM symbols.

Figure 11:
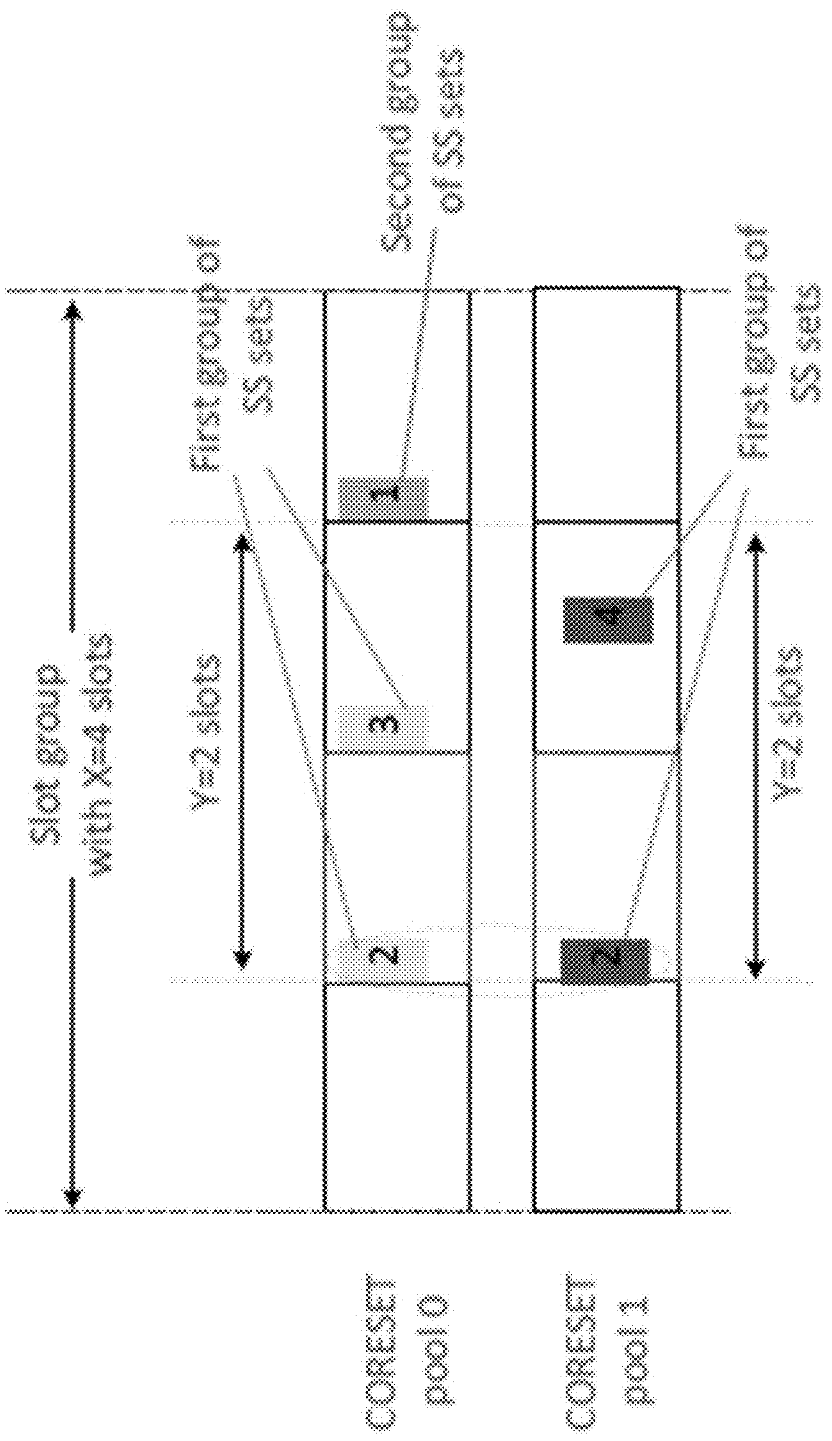
FIG. 11 illustrates more than one span in each slot for a group of SS sets in accordance with some embodiments.

FIG. 11 illustrates more than one span in each slot for a group of SS sets in accordance with some embodiments. FIG. 11 shows an example of a configuration of spans for the first group of SS sets with combination (4, 2). The spans for the CORESET pool 0 are still limited to the span of beginning 3 symbols in each of the Y=2 slots. On the other hand, the spans for the CORESET pool 1 can be in any position in each of the Y=2 slots. The total number of spans in the Y=2 slots is limited to 3.

In one embodiment, in NR multi-DCI M-TRP operation with multi-slot PDCCH monitoring capability, PDCCH overbooking is only applicable to the SS sets that are associated with the first CORESET pool with coresetPoolIndex value 0 on the PCell or PSCell.

In one embodiment, in NR multi-DCI M-TRP operation with multi-slot PDCCH monitoring capability, PDCCH overbooking is only supported on the PCell or PSCell without differentiation of CORESET pools.

Search Space Set Configuration

In existing NR, a SS set can be configured by higher layer parameters monitoringSlotPeriodicityAndOffset, duration and monitoringSymbolsWithinSlot. The parameter monitoringSlotPeriodicityAndOffset indicates the periodicity and slot offset in a period for the SS set. The parameter duration indicates the number of consecutive slots starting from the slot offset determined by monitoringSlotPeriodicityAndOffset. The parameter monitoringSymbolsWithinSlot indicates the starting symbols of the PDCCH MO in a slot. The MOs indicated by monitoringSymbolsWithinSlot applies to each slot indicated by duration. To configure a SS set with multi-slot PDCCH monitoring capability combination (X, Y), similar parameters are used with adjustment.

A first parameter can be used to configure the periodicity and slot offset in a period that is configured with PDCCH MOs for a SS set. The parameter may be still named monitoringSlotPeriodicityAndOffset. The slot offset may indicate the starting slot index of the first slot group with X slots on which the MOs of the SS set is configured. Alternatively, the slot offset may indicate any slot index in the first slot group with X slots on which the MOs of the SS set is configured. For example, the indicated slot index within a slot group is mod(o,X), o is the slot offset configured by monitoringSlotPeriodicityAndOffset.

A second parameter can indicate the number of consecutive slots or slot groups starting from the slot offset determined by the first parameter for a SS set. The parameter may be still named duration. duration can be configured as multiple of X slots.

For a combination (X, Y), a SS set in the first group of SS sets is only configured within the Y slots in every slot group of X slots. On the other hand, a SS set belonging to the second group of SS sets can be configured in any slot(s) in a slot group of X slots. A third parameter can be used to indicate the starting symbols of the PDCCH MOs in a variable number M consecutive slots in a slot group of X slots for a SS set. Further, the M slots in a slot group can be repeated in every N slot groups in duration for the SS sets. N is configured by higher layer or predefined, e.g., N=1. The first slot of the M slots can be derived by the slot offset indicted by the first parameter, e.g., mod(o,X). The parameter can be named monitoringSymbolsWithinMSlots. M can be dependent on the type of a SS set. M could be configured by higher layer or predefined. Further, it may be up to the gNB to select a proper value M for the configuration of a SS set. For example, a SS set in the first group of SS sets may be configured in M=1 slot in the Y slots in a slot group of X slots. Alternatively, a SS set in the first group of SS sets may be configured in 1<M≤Y slots in the Y slots in a slot group of X slots if Y>1. For a SS set in the second group of SS sets, e.g., Type0A/2 CSS set with searchSpaceID non-zero, it may be configured in M=X slots in the slot group.

The parameter monitoringSymbolsWithinMSlots can be a bitmap of 14*M bits. Alternatively, monitoringSymbolsWithinMSlots may include a bitmap A of 14 bits to indicate the MOs for the SS set in a slot, e.g., monitoringSymbolsWithinSlot, and another bitmap B of M bits that indicates the slot(s) with configured MOs for the SS set. In the latter scheme, if the bitmap B is not configured for the SS set, the UE can assume M=1 and the configure MOs of the SS set is in slot mod(o, $X_c$). The bitmap B may have Xc bits, e.g., Xc=4 or 8 for SCS 480 kHz or 960 kHz. The bitmap B may have a constant of 8 bits. If the value X of combination (X, Y) is configured by higher layer signaling, X<length of bitmap B, the beginning X bits of the bitmap B may indicate the slot(s) with configured MOs for the SS set in a slot group of X slots. Alternatively, the bitmap B may indicate the configured MOs of a SS set in one or multiple consecutive slot groups. The configured MOs of the SS set may repeat in the multiple consecutive slot groups. For example, if value X of combination (X, Y) is 4 and the length of bitmap B is 8, the bitmap B indicates the slots with configured MOs for the SS set in two consecutive slot groups.

Figure 12:
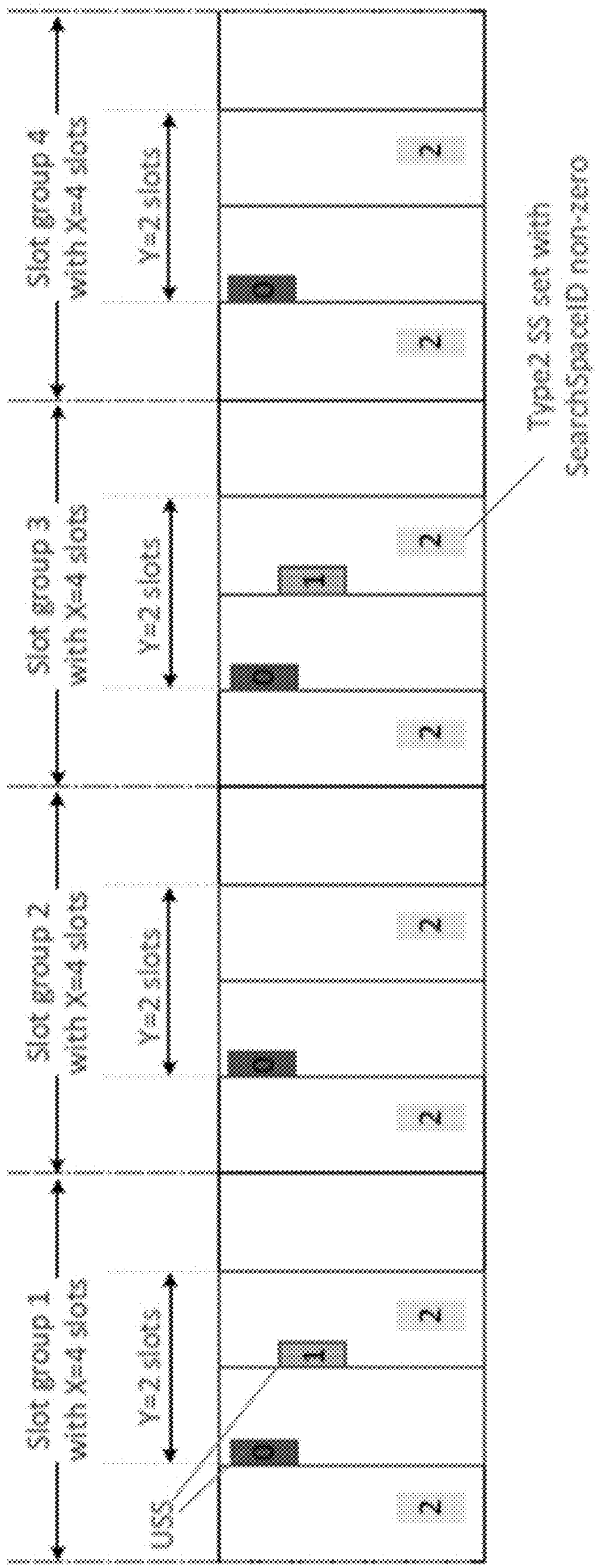
FIG. 12 illustrates an SS set configuration with a variable length monitoringSymbolsWithinMSlots in accordance with some embodiments.

FIG. 12 illustrates an SS set configuration with a variable length monitoringSymbolsWithinMSlots in accordance with some embodiments. That is, the example of FIG. 12 shows the SS set configuration in a variable number of consecutive slots in the Y slots or the X slots in a slot group. In FIG. 12:

the USS set 0 is configured in the first slot of Y=2 slots in a slot group of X slots, which is repeated in every slot group in duration. The parameter monitoringSymbolsWithinMSlots indicates the starting symbol(s) of the MOs for the SS set in the slot. The index of the slot within a slot group is mod(o,X)=1, o is the slot offset configured by monitoringSlotPeriodicityAndOffset;

the USS set 1 is configured in the second slot of Y=2 slots in a slot group of X slots which is repeated in every 2 slot groups in duration. The parameter monitoringSymbolsWithinMSlots indicates the starting symbol(s) of the MOs for the SS set in the slot. The index of the slot within a slot group is mod(o,X)=2, o is the slot offset configured by monitoringSlotPeriodicityAndOffse; and the Type2 CSS set with searchSpaceID non-zero is configured in slot 0 and 2 in a slot group. correspondingly, the parameter monitoringSymbolsWithinMSlots indicates the starting symbol(s) of the MOs for the SS set in the X slots.

Figure 13:
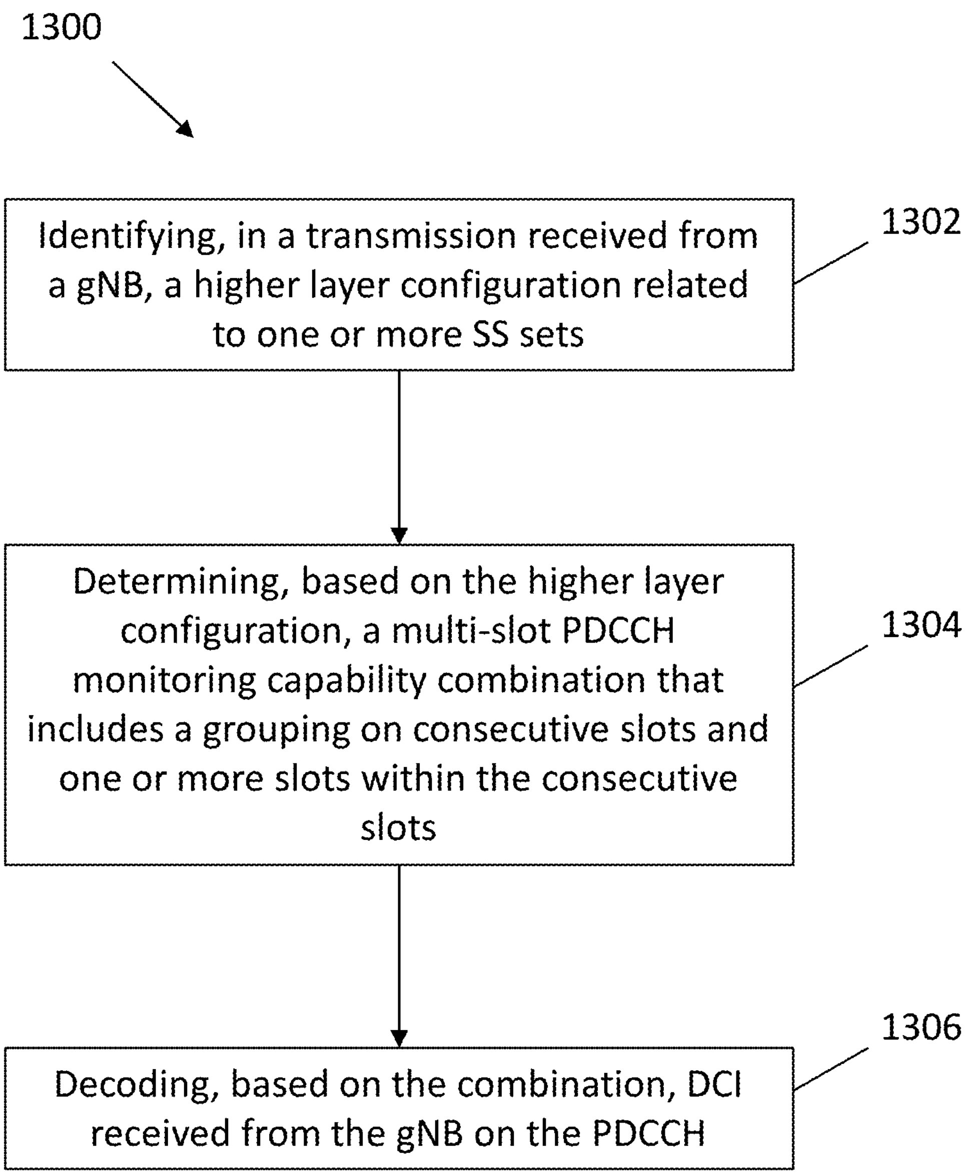
FIG. 13 illustrates a flowchart of downlink control information (DCI) reception in accordance with some embodiments.

FIG. 13 illustrates a flowchart of DCI reception in accordance with some embodiments. Additional operations may be present in the method 1300 of FIG. 13, but are not shown for convenience. The method 1300 may be performed by a UE in a 5G cellular network. The method 1300 may include identifying, at operation 1302, in a transmission received from a gNB, a higher layer configuration related to one or more SS sets; determining, at operation 1304 based on the higher layer configuration, a multi-slot physical PDCCH monitoring capability combination (X, Y), wherein X refers to a grouping of consecutive slots and Y refers to one or more slots within X; and decoding, at operation 1304 based on the combination (X, Y), DCI received from the gNB on the PDCCH.

Figure 14:
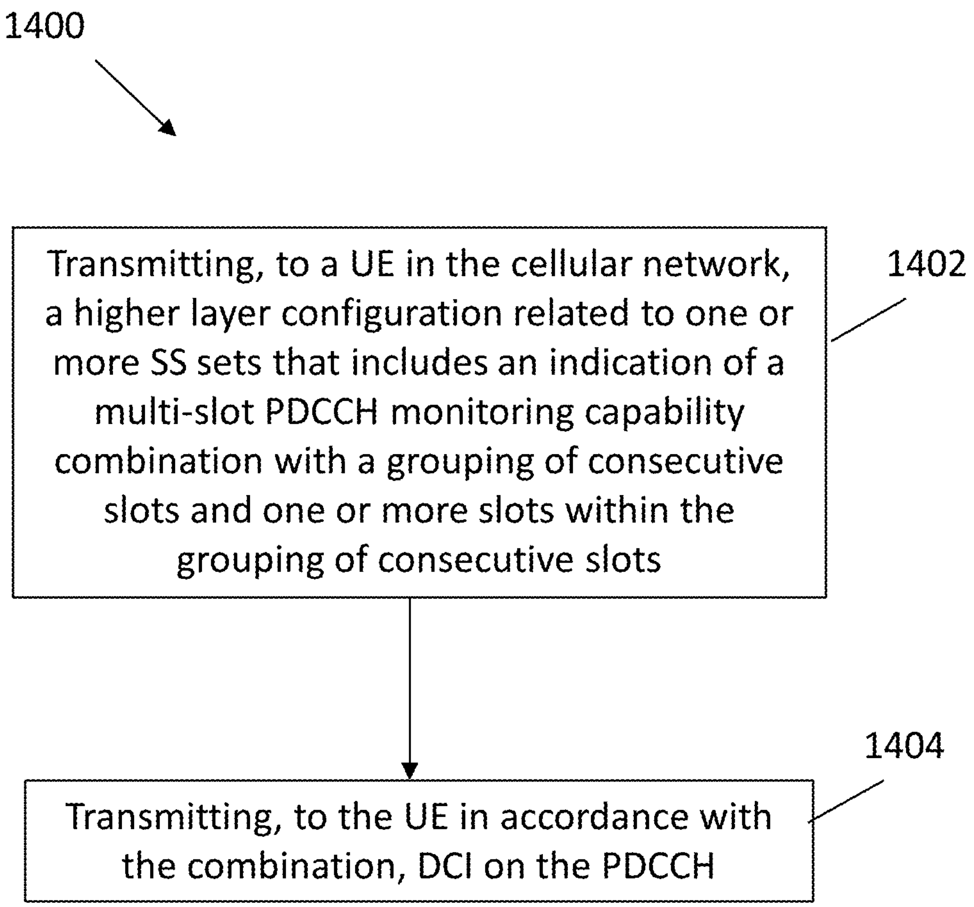
FIG. 14 illustrates a flowchart of DCI transmission in accordance with some embodiments.

FIG. 14 illustrates a flowchart of DCI transmission in accordance with some embodiments. Additional operations may be present in the method 1400 of FIG. 14, but are not shown for convenience. The method 1400 may be performed by a gNB in a 5G cellular network. The method 1300 may include transmitting, at operation 1402 to a UE in the network, a higher layer configuration related to one or more SS sets, wherein the higher layer configuration include an indication of a multi-slot PDCCH monitoring capability combination (X, Y), wherein X refers to a grouping of consecutive slots and Y refers to one or more slots within X; and transmitting, at operation 1304 to the UE in accordance with the combination (X, Y), DCI in the PDCCH.

EXAMPLES

Example 1 is an apparatus for a user equipment (UE), the apparatus comprising: memory; and processing circuitry, to configure the UE to: receive, from a next generation radio access network (NG-RAN) node, a higher layer configuration indicating a plurality of search space (SS) sets for communications above 52.6 GHz; and determine, based on the higher layer configuration, a multi-slot physical downlink control channel (PDCCH) monitoring capability combination (X, Y) in which X is a number of consecutive slots that form a slot group and Y is a number of consecutive monitored slots within the slot group; and decode downlink control information (DCI) of a PDCCH based on the PDCCH monitoring capability combination (X, Y); and wherein the memory is configured to store the DCI.

In Example 2, the subject matter of Example 1 includes, wherein the processing circuitry configures the UE to: count a SS set in a span that is not monitored in a particular slot group; and determine, based on the SS set, total numbers of monitored PDCCH candidates and non-overlapped control channel elements (CCEs) in the particular slot group.

In Example 3, the subject matter of Example 2 includes, wherein the processing circuitry configures the UE to: make a determination that at least one monitoring occasion (MO) in the particular slot group is of a Type 0A/2 common search space (CSS) set with searchSpaceId non-zero are not associated with at least one specific signaling system block (SSB); and exclude, based on the determination, the at least one MO from the total numbers.

In Example 4, the subject matter of Examples 2-3 includes, wherein the processing circuitry configures the UE to: make a determination that at least one of: at least one monitoring occasion (MO) in the particular slot group is of a Type 0A/2 common search space (CSS) set with searchSpaceId non-zero are not associated with at least one specific signaling system block (SSB), or at least one of paging information or a system information update is not detected; and exclude, based on the determination, the at least one MO from the total numbers.

In Example 5, the subject matter of Examples 1-4 includes, wherein the processing circuitry configures the UE to: drop a span of SS sets in a particular slot group; and determine, excluding the span of SS sets, total numbers of monitored PDCCH candidates and non-overlapped control channel elements (CCEs) in the particular slot group.

In Example 6, the subject matter of Examples 1-5 includes, wherein the processing circuitry configures the UE to separately determine each of a plurality of PDCCH monitoring capability combinations of different control resource set (CORESET) pools.

In Example 7, the subject matter of Examples 1-6 includes, wherein the processing circuitry configures the UE to determine each of a plurality of PDCCH monitoring capability combinations of different control resource set (CORESET) pools based on an identical number of consecutive slots that form each slot group.

In Example 8, the subject matter of Examples 1-7 includes, wherein the processing circuitry configures the UE to determine each of a plurality of PDCCH monitoring capability combinations of different control resource set (CORESET) pools based on an identical number of consecutive slots that form each slot group and an identical number of consecutive monitored slots within each slot group.

In Example 9, the subject matter of Example 8 includes, wherein the consecutive monitored slots have identical positions within each slot group.

In Example 10, the subject matter of Example 9 includes, wherein, within a particular slot of the consecutive monitored slots, monitoring occasions (MOs) of the SS sets associated with the CORESET pools are configured in an identical span.

In Example 11, the subject matter of Examples 9-10 includes, wherein, within a particular slot of the consecutive monitored slots, monitoring occasions (MOs) of the SS sets associated with the CORESET pools are configured in different spans.

In Example 12, the subject matter of Examples 10-11 includes, SS sets that are associated with CORESETs having identical coresetPoolIndex values are monitored in up to M spans in a Y=1 slot, a total number of spans in the Y=1 slot is N, and M≤N≤2M.

In Example 13, the subject matter of Example 12 includes, SS sets that are associated with CORESETs having a first coresetPoolIndex value are configured in a span of a first n consecutive Orthogonal Frequency Domain Multiplexing (OFDM) symbols of each of the Y slots, and SS sets that are associated with CORESETs having a second coresetPoolIndex value are configured in a span of a second n consecutive OFDM symbols of each of the Y slots.

In Example 14, the subject matter of Examples 1-13 includes, wherein the processing circuitry configures the UE to determine the multi-slot PDCCH monitoring capability combination based on all SS sets configured for the UE.

In Example 15, the subject matter of Examples 1-14 includes.

In Example 16, the subject matter of Example 15 includes.

Example 17 is an apparatus for a next generation radio access network (NG-RAN) node, the apparatus comprising: memory; and processing circuitry, to configure the NG-RAN node to: transmit, to a user equipment (UE), a higher layer configuration indicating a plurality of search space (SS) sets for communications above 52.6 GHz; and transmit, to the UE, downlink control information (DCI) in a physical downlink control channel (PDCCH) for decoding using a PDCCH monitoring capability combination (X,Y) in which X is a number of consecutive slots that form a slot group and Y is a number of consecutive monitored slots within the slot group; and wherein the memory is configured to store the DCI.

In Example 18, the subject matter of Example 17 includes, wherein: a SS set in a span that is not monitored in a particular slot group is count to determine total numbers of monitored PDCCH candidates and non-overlapped control channel elements (CCEs) in the particular slot group, and at least one monitoring occasion (MO) in the particular slot group is of a Type 0A/2 common search space (CSS) set with searchSpaceId non-zero are not associated with at least one specific signaling system block (SSB), and the at least one MO excluded from the total numbers.

Example 19 is a non-transitory computer-readable storage medium that stores instructions for execution by one or more processors of a user equipment (UE), the one or more processors to configure the UE to, when the instructions are executed: receive, from a next generation radio access network (NG-RAN) node, a higher layer configuration indicating a plurality of search space (SS) sets for communications above 52.6 GHz; determine, based on the higher layer configuration, a multi-slot physical downlink control channel (PDCCH) monitoring capability combination (X, Y) in which X is a number of consecutive slots that form a slot group and Y is a number of consecutive monitored slots within the slot group; and decode downlink control information (DCI) of a PDCCH based on the PDCCH monitoring capability combination (X, Y).

In Example 20, the subject matter of Example 19 includes, wherein the instructions, when executed by the one or more processors, configure the UE to: count a SS set in a span that is not monitored in a particular slot group, determine, based on the SS set, total numbers of monitored PDCCH candidates and non-overlapped control channel elements (CCEs) in the particular slot group, make a determination that at least one monitoring occasion (MO) in the particular slot group is of a Type 0A/2 common search space (CSS) set with searchSpaceId non-zero are not associated with at least one specific signaling system block (SSB), and exclude, based on the determination, the at least one MO from the total numbers.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A user equipment (UE) comprising:

processing circuitry to configure the UE to:

receive, from a base station for communications above 52.6 GHz, a higher layer configuration indicating one or more search space sets for physical downlink control channel (PDCCH) monitoring with a subcarrier spacing configuration that is one of 480 kHz and 960 kHz, the higher layer configuration comprising a duration parameter that indicates at least one of a number of slots that a search space set exists and a number of slots in consecutive groups of slots where the search space set can exist;

determine, based on the higher layer configuration, a multi-slot PDCCH monitoring capability defined by a first number of consecutive slots forming a slot group and a second number of consecutive slots within the slot group, the second number of consecutive slots for monitoring PDCCH for a first group of search space sets, the first number of consecutive slots being selected from 4 and 8 and the second number of consecutive slots being selected from 1, 2, and 4;

determine a total number of PDCCH candidates and a total number of non-overlapping control channel elements (CCEs) to monitor within a slot group based on the multi-slot PDCCH monitoring capability; and monitor PDCCH candidates for the first group of search space sets within the second number of consecutive slots of each slot group according to the total number of PDCCH candidates and the total number of non-overlapping CCEs; and memory configured to store the higher layer configuration.

2. The UE of claim 1, wherein the subcarrier spacing configuration is 960 kHz.

3. The UE of claim 2, wherein:

the first number of consecutive slots is 8, the second number of consecutive slots is selected from 1 and 4, and the total number of PDCCH candidates does not exceed 20 and the total number of non-overlapping CCEs does not exceed 32 per slot group.

4. The UE of claim 1, wherein:

the processing circuitry further configures the UE to, in response to being provided a zero value for a search space set identifier in a common control configuration for a Type 0A or Type 2 common search space set, monitor PDCCH candidates only at monitoring occasions associated with a synchronization signal and physical broadcast channel (SS/PBCH) block; and the SS/PBCH block is determined by a most recent of:

an indicator of a transmission configuration indicator state of an active bandwidth part that includes a control resource set with index zero, where the transmission configuration indicator state includes a channel state information reference signal that is quasi-co-located with the SS/PBCH block, or a random access procedure that is not initiated by a PDCCH order that triggers a contention-free random access procedure.

5. The UE of claim 1, wherein:

a first subset of the one or more search space sets is associated with control resource sets (CORESETs) having a control resource set pool index value of zero;

a second subset of the one or more search space sets is associated with CORESETs having a control resource set pool index value of one; and the processing circuitry configures the UE to monitor PDCCH candidates in CORESETs from both the first subset and the second subset within the second number of consecutive slots of a slot group.

6. The UE of claim 1, wherein the higher layer configuration further comprises:

a first parameter indicating a monitoring periodicity and a monitoring offset for a search space set of the one or more search space sets, a second parameter indicating a duration for the search space set, the duration indicating at least one of a number of slots or a number of slots in consecutive slot groups, and a third parameter indicating a monitoring pattern for the search space set, the monitoring pattern indicating at least one of:

first symbols of monitoring occasions within each slot where PDCCH is monitored, or slots within a slot group for monitoring PDCCH.

7. The UE of claim 1, wherein the processing circuitry further configures the UE to:

allocate monitoring of PDCCH candidates to UE-specific search space (USS) sets within a slot group such that the total number of PDCCH candidates and the total number of non-overlapping CCEs do not exceed maximum values for the slot group; and not monitor PDCCH in a USS set that is not allocated monitoring.

8. The UE of claim 1, wherein:

the processing circuitry further configures the UE to indicate a capability to monitor a PDCCH according to multiple combinations of the first number of consecutive slots and the second number of consecutive slots;

for a first subcarrier spacing configuration, a first subset of the multiple combinations is available for monitoring; and for a second subcarrier spacing configuration different from the first subcarrier spacing configuration, a second subset of the multiple combinations is available for monitoring, wherein the second subset includes at least one combination that is not in the first subset.

9. The UE of claim 1, wherein:

for the subcarrier spacing configuration of 960 kHz, the first number of consecutive slots can be selected from 4 and 8; and for the subcarrier spacing configuration of 480 kHz, the first number of consecutive slots is 4.

10. The UE of claim 1, wherein the higher layer configuration further comprises:

a monitoring pattern parameter that indicates slots in the slot group for monitoring PDCCH, for a UE-specific search space set (USS) or a Type 3 common search space set (CSS), the monitoring pattern parameter indicates only consecutive slots in the slot group and a number of the consecutive slots is not larger than the second number of consecutive slots, and for a Type 0A or Type 2 CSS, the monitoring pattern parameter indicates slots in the slot group that are not restricted to be consecutive.

11. A non-transitory computer-readable storage medium that stores instructions for execution by a processor of a user equipment (UE), the processor configuring the UE to, when the instructions are executed:

receive, from a base station for communications above 52.6 GHz, a higher layer configuration indicating one or more search space sets for physical downlink control channel (PDCCH) monitoring with a subcarrier spacing configuration that is one of 480 kHz and 960 kHz, the higher layer configuration comprising a duration parameter that indicates at least one of a number of slots that a search space set exists and a number of slots in consecutive groups of slots where the search space set can exist determine, based on the higher layer configuration, a multi-slot PDCCH monitoring capability defined by a first number of consecutive slots forming a slot group and a second number of consecutive slots within the slot group, the second number of consecutive slots for monitoring PDCCH for a first group of search space sets, the first number of consecutive slots being selected from 4 and 8 and the second number of consecutive slots being selected from 1, 2, and 4;

determine a total number of PDCCH candidates and a total number of non-overlapping control channel elements (CCEs) to monitor within a slot group based on the multi-slot PDCCH monitoring capability; and monitor PDCCH candidates for the first group of search space sets within the second number of consecutive slots of each slot group according to the total number of PDCCH candidates and the total number of non-overlapping CCEs.

12. The non-transitory computer-readable storage medium of claim 11, wherein:

the processor further configures the UE to, when the instructions are executed, in response to being provided a zero value for a search space set identifier in a common control configuration for a Type 0A or Type 2 common search space set, monitor PDCCH candidates only at monitoring occasions associated with a synchronization signal and physical broadcast channel (SS/PBCH) block; and the SS/PBCH block is determined by a most recent of:

an indication of a transmission configuration indicator state of an active bandwidth part that includes a control resource set with index zero, where the transmission configuration indicator state includes a channel state information reference signal that is quasi-co-located with the SS/PBCH block, or a random access procedure that is not initiated by a PDCCH order that triggers a contention-free random access procedure.

13. The non-transitory computer-readable storage medium of claim 11, wherein:

a first subset of the one or more search space sets is associated with control resource sets (CORESETs) having a control resource set pool index value of zero;

a second subset of the one or more search space sets is associated with CORESETs having a control resource set pool index value of one; and the processor further configures the UE to, when the instructions are executed, monitor PDCCH candidates in CORESETs from both the first subset and the second subset within the second number of consecutive slots of a slot group.

14. The non-transitory computer-readable storage medium of claim 11, wherein the higher layer configuration further comprises:

a first parameter indicating a monitoring periodicity and a monitoring offset for a search space set of the one or more search space sets, a second parameter indicating a duration for the search space set, the duration indicating at least one of a number of slots or a number of slots in consecutive slot groups, and a third parameter indicating a monitoring pattern for the search space set, the monitoring pattern indicating at least one of:

first symbols of monitoring occasions within each slot where PDCCH is monitored, or slots within a slot group for monitoring PDCCH.

15. The non-transitory computer-readable storage medium of claim 11, wherein the processor further configures the UE to, when the instructions are executed:

allocate monitoring of PDCCH candidates to UE-specific search space (USS) sets within a slot group such that the total number of PDCCH candidates and the total number of non-overlapping CCEs do not exceed maximum values for the slot group; and not monitor PDCCH in a USS set that is not allocated monitoring.

16. The non-transitory computer-readable storage medium of claim 11, wherein:

the processor further configures the UE to, when the instructions are executed indicate a capability to monitor physical downlink control channel according to multiple combinations of the first number of consecutive slots and the second number of consecutive slots;

for a first subcarrier spacing configuration, a first subset of the multiple combinations is available for monitoring; and for a second subcarrier spacing configuration different from the first subcarrier spacing configuration, a second subset of the multiple combinations is available for monitoring, wherein the second subset includes at least one combination that is not in the first subset.

17. The non-transitory computer-readable storage medium of claim 11, wherein the higher layer configuration further comprises:

a monitoring pattern parameter that indicates slots in the slot group for monitoring PDCCH, for a UE-specific search space set (USS) or a Type 3 common search space set (CSS), the monitoring pattern parameter indicates only consecutive slots in the slot group and a number of the consecutive slots is not larger than the second number of consecutive slots, and for a Type 0A or Type 2 CSS, the monitoring pattern parameter indicates slots in the slot group that are not restricted to be consecutive.

18. A non-transitory computer-readable storage medium that stores instructions for execution by a processor of a user equipment (UE), the processor configuring the UE to, when the instructions are executed:

receive, from a base station for communications above 52.6 GHz, a higher layer configuration indicating one or more search space sets for physical downlink control channel (PDCCH) monitoring with a subcarrier spacing configuration that is one of 480 kHz and 960 kHz, the higher layer configuration comprising a duration parameter that indicates at least one of a number of slots that a search space set exists and a number of slots in consecutive groups of slots where the search space set can exist;

determine, based on the higher layer configuration, a multi-slot PDCCH monitoring capability defined by a first number of consecutive slots forming a slot group and a second number of consecutive slots within the slot group, the second number of consecutive slots for monitoring PDCCH for a first group of search space sets;

determine a total number of PDCCH candidates and a total number of non-overlapping control channel elements (CCEs) to monitor within a slot group based on the multi-slot PDCCH monitoring capability; and monitor PDCCH candidates for the first group of search space sets within the second number of consecutive slots of each slot group according to the total number of PDCCH candidates and the total number of non-overlapping CCEs.

19. The non-transitory computer-readable storage medium of claim 18, wherein the higher layer configuration further comprises:

a first parameter indicating a monitoring periodicity and a monitoring offset for a search space set of the one or more search space sets, a second parameter indicating a duration for the search space set, the duration indicating at least one of a number of slots or a number of slots in consecutive slot groups, and a third parameter indicating a monitoring pattern for the search space set, the monitoring pattern indicating at least one of:

first symbols of monitoring occasions within each slot where PDCCH is monitored, or slots within a slot group for monitoring PDCCH.

20. The non-transitory computer-readable storage medium of claim 18, wherein the higher layer configuration further comprises:

a monitoring pattern parameter that indicates slots in the slot group for monitoring PDCCH, for a UE-specific search space set (USS) or a Type 3 common search space set (CSS), the monitoring pattern parameter indicates only consecutive slots in the slot group and a number of the consecutive slots is not larger than the second number of consecutive slots, and for a Type 0A or Type 2 CSS, the monitoring pattern parameter indicates slots in the slot group that are not restricted to be consecutive.

* * * * *